United States Patent
Carbune et al.

(10) Patent No.: US 12,106,758 B2
(45) Date of Patent: Oct. 1, 2024

(54) VOICE COMMANDS FOR AN AUTOMATED ASSISTANT UTILIZED IN SMART DICTATION

(71) Applicant: GOOGLE LLC, Mountain View, CA (US)

(72) Inventors: Victor Carbune, Zurich (CH); Alvin Abdagic, Zurich (CH); Behshad Behzadi, Freienbach (CH); Jacopo Sannazzaro Natta, Berkeley, CA (US); Julia Proskurnia, Zurich (CH); Krzysztof Andrzej Goj, Zurich (CH); Srikanth Pandiri, Zurich (CH); Viesturs Zarins, Zurich (CH); Nicolo D'Ercole, Oberrieden (CH); Zaheed Sabur, Baar (CH); Luv Kothari, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 611 days.

(21) Appl. No.: 17/322,765

(22) Filed: May 17, 2021

(65) Prior Publication Data

US 2022/0366910 A1    Nov. 17, 2022

(51) Int. Cl.
*G06F 3/01* (2006.01)
*G06F 3/0488* (2022.01)
(Continued)

(52) U.S. Cl.
CPC ............ *G10L 15/26* (2013.01); *G06F 3/0488* (2013.01); *G06N 20/00* (2019.01); *G10L 15/18* (2013.01);
(Continued)

(58) Field of Classification Search
USPC .................... 704/1–275; 706/1–62, 900–903
See application file for complete search history.

(56) References Cited

U.S. PATENT DOCUMENTS

| 10,854,192 | B1 | 12/2020 | Maas et al. |
| 2013/0158995 | A1* | 6/2013 | Romriell ............... G06F 40/279 |
| | | | 704/235 |

(Continued)

FOREIGN PATENT DOCUMENTS

WO       2021076166       4/2021

OTHER PUBLICATIONS

WO 2021076166, Pandiri Srikanth; Voice-Controlled Entry of Content Into Graphical User Interfaces, Apr. 22, 2021 (Year: 2021).*

(Continued)

*Primary Examiner* — Marcellus J Augustin
(74) *Attorney, Agent, or Firm* — Gray Ice Higdon

(57) ABSTRACT

Systems and methods described herein relate to determining whether to incorporate recognized text, that corresponds to a spoken utterance of a user of a client device, into a transcription displayed at the client device, or to cause an assistant command, that is associated with the transcription and that is based on the recognized text, to be performed by an automated assistant implemented by the client device. The spoken utterance is received during a dictation session between the user and the automated assistant. Implementations can process, using automatic speech recognition model(s), audio data that captures the spoken utterance to generate the recognized text. Further, implementations can determine whether to incorporate the recognized text into the transcription or cause the assistant command to be performed based on touch input being directed to the transcription, a state of the transcription, and/or audio-based characteristic(s) of the spoken utterance.

20 Claims, 12 Drawing Sheets

(51) Int. Cl.
  *G06N 20/00* (2019.01)
  *G10L 15/18* (2013.01)
  *G10L 15/22* (2006.01)
  *G10L 15/26* (2006.01)
(52) U.S. Cl.
  CPC ........ *G10L 15/22* (2013.01); *G10L 2015/223* (2013.01)

(56) References Cited

U.S. PATENT DOCUMENTS

2017/0278514 A1* 9/2017 Mathias ................. G06F 16/35
2021/0225377 A1* 7/2021 Zhao .................... G06F 40/166
2023/0377575 A1* 11/2023 Locascio ............. G06V 40/161

OTHER PUBLICATIONS

WO2017160341, Gruber Thomas R; Dictation That Allows Editing; Sep. 21, 2017 (Year: 2017).*
European Patent Office; International Search Report and Written Opinion issued in Application No. PCT/US2021/062613; 14 pages; dated Apr. 4, 2022.

* cited by examiner

VOICE COMMANDS FOR AN AUTOMATED ASSISTANT UTILIZED IN SMART DICTATION

BACKGROUND

Humans can engage in human-to-computer dialog sessions with interactive software applications referred to herein as "automated assistants" (also referred to as "chat bots," "interactive personal assistants," "intelligent personal assistants," "personal voice assistants," "conversational agents," etc.). For example, a human (which when interacting with an automated assistant may be referred to as a "user") may provide an input (e.g., commands, queries, and/or requests) to the automated assistant that can cause the automated assistant to generate and provide responsive output, to control one or more Internet of things (IoT) devices, and/or to perform one or more other functionalities. The input provided by the user can be, for example, spoken natural language input (i.e., spoken utterances) which may in some cases be converted into text (or other semantic representation) and then further processed, and/or typed natural language input.

Automated assistants typically rely upon a pipeline of components in interpreting and responding to user inputs. For example, an automatic speech recognition (ASR) engine can be used to process audio data that captures a spoken utterance of a user, and to generate ASR output, such as a transcription (i.e., sequence of term(s) and/or other token(s)) of the spoken utterance. Further, a natural language understanding (NLU) engine can be used to process the ASR output, and to generate NLU output, such as an intent of the user in providing the spoken utterance and optionally slot value(s) for parameter(s) associated with the intent. Moreover, a fulfillment engine can be used to process the NLU output, and to generate fulfillment output, such as a structured request to obtain content that is responsive to the spoken utterance or cause some action to be performed responsive to the spoken utterance.

In some cases, automated assistants may be utilized to dictate transcriptions for a variety of different purposes. For example, a user can provide spoken utterances to the automated assistant, and the automated assistant can process, using the ASR engine, the spoken utterances to generate the transcriptions as text messages, e-mails, notes, and any other text for utilization by respective software applications or an automated assistant application associated with the automated assistant. In some of these cases, the spoken utterances received while the automated assistant is dictating text on behalf of the user may additionally or alternatively include assistant commands that indicate a desire from the user that the automated assistant perform some action responsive to the spoken utterance. However, automated assistants may not be able to differentiate between portions of spoken utterances that should be dictated and portions of spoken utterances that should cause the automated assistant to perform some action. As a result, users may have to manually edit these transcriptions or repeat the same spoken utterances that have already been provided, thereby increasing a quantity of user inputs received at client devices, prolonging the human-to-computer dialog session, and wasting computational resources.

SUMMARY

Implementations described herein relate to determining whether to incorporate recognized text, that corresponds to a spoken utterance of a user of a client device, into a transcription displayed at the client device or to cause an assistant command, that is associated with the transcription and that is based on the recognized text, to be performed by an automated assistant implemented by the client device. The spoken utterance is received during a dictation session between the user and the automated assistant. As used herein, the term dictation session can refer to any human-to-computer dialog session between the user and the automated assistant where the automated assistant is utilized to dictate one or more textual segments, on behalf of the user, and for inclusion in a transcription that is associated with one or more software applications that are accessible at the client device. In some implementations, the spoken utterance can be received to initiate and complete the dictation session based on a single spoken utterance, whereas in other implementations, the spoken utterance can be received as part of an ongoing dictation session that is based on multiple spoken utterances. The one or more software applications can include any software application in which the user can dictate text, such as an email application, a text messaging application, a calendar application, a notes application, an automated assistant application (e.g., that can transmit the dictated text to other software applications), and/or any other software application in which the user can dictate text and that is accessible at the client device. The transcription can include a body, and optionally be associated with one or more fields that are based on a given software application associated with the transcription. For example, the transcription can be associated with a "to" field and a "subject" field when the transcription is an email associated with an email application, a "recipient" field when the transcription is a text message associated with a text messaging application, a "date" field and/or a "time" field when the transcription is a calendar entry associated with a calendar application, a "title" field when the transcription is a note associated with a notes application, and so on.

In some implementations, determining whether to incorporate the recognized text into the transcription, or to cause the assistant command to be performed by the automated assistant can be based on touch input of the user of the client device being directed to the transcription. The touch input can be directed to one or more regions of the transcription, such as the body of the transcription (or one or more textual segments thereof), one or more of the fields of the transcription, one or more spaces included in the transcription, and/or any other regions of the transcription. In some implementations, the touch input may only be considered if it is simultaneous touch input that is received along with the spoken utterance. The touch input can be considered simultaneous touch input if it is received at the same time as the spoken utterance or within a threshold duration of time.

For example, assume the user is drafting in an email via an email application that is accessible at the client device. Further assume that the user provides a spoken utterance of "send it to Tom" as part of a dictation session for drafting the email. In some implementations, "send it to Tom" may be incorporated into a body of the email, whereas in other implementations, an assistant command of adding a recipient associated with the entity "Tom" may be performed. For instance, assume the user did not provide any touch input when the spoken utterance was received. In this instance, the recognized text corresponding to the spoken utterance may be incorporated into the body of the email without any assistant command being performed. In contrast, assume that the user also provided touch input directed to a "to" field of the email when the spoken utterance was received. In this instance, the assistant command of adding a recipient associated with the entity "Tom" may be performed without incorporating any recognized text into the body of the email.

In additional or alternative implementations, determining whether to incorporate the recognized text into the transcription, or to cause the assistant command to be performed by the automated assistant can be based on one or more audio-based characteristics of audio data that captures the spoken utterance. The audio-based characteristics can be determined based on processing the audio data using one or more audio-based machine learning (ML) models. In some implementations, the audio data that captures the spoken utterance can be processed, using endpointing model(s), to determine whether the spoken utterance includes one or more pauses and optionally location(s) of the one or more pauses in the spoken utterance. In additional or alternative implementations, the audio data that captures the spoken utterance can be processed, using warm word model(s), to determine whether the spoken utterance includes one or more particular words or phrases (e.g., warm words, such as "send", "set", "change", "highlight", and/or any other word or phrase associated with an assistant command that can be performed with respect to the transcription) and optionally location(s) of the one or more particular words or phrases in the spoken utterance. The warm word model(s) can be audio keyword classification model(s) that are trained to detect one or more of the particular words or phrases in the audio data that captures the spoken utterance and/or text-based classification model(s) that leverage signals from other ML model(s) that process the audio data corresponding to the spoken utterance to detect one or more of the particular words or phrases (e.g., leverage ASR output generated using ASR model(s) and/or endpointing output generated using endpointing model(s)).

For example, assume the user is drafting a text message via a text messaging that is accessible at the client device. Further assume that the user provides a spoken utterance of "Hey Alex, how are you? Send it" as part of a dictation session for drafting the text message. In this example, the automated assistant can determine whether "send it" should be incorporated into a body of the text message or should cause an assistant command of causing the text message to be transmitted to an additional user (e.g., "Alex"). For instance, assume audio data that captures the spoken utterance is processed using an endpointing model that generates output indicating the user paused between "you" and "send". Further assume the audio data that captures the spoken utterance is processed using a warm word model that generates output indicating "send" can be an assistant command that causes the text message to be sent to the additional user. In this example, based on one or more of the pauses (and/or a location thereof in the spoken utterance) and the presence of the warm word "send" (and/or a location thereof in the spoken utterance), the automated assistant may determine to perform an assistant command of causing the text message (e.g., "Hey Alex, how are you?") to be transmitted to the additional user (e.g., "Alex").

In contrast, assume the user is again drafting a text message via the text messaging that is accessible at the client device. However, assume that the user provides a spoken utterance of "Hey Alex, did you send it to Julia?" as part of the dictation session for drafting the text message. In this example, the automated assistant can determine whether "send it" should be incorporated into a body of the text message or should cause an assistant command of causing the text message to be transmitted to an additional user (e.g., "Alex"). In this instance, assume audio data that captures the spoken utterance is processed using an endpointing model that generates output indicating the user did not pause. Further assume the audio data that captures the spoken utterance is processed using a warm word model that generates output indicating "send" can be an assistant command that causes the text message to be sent to the additional user. In this example, based on one or more of the pauses (or lack thereof), the automated assistant may determine to incorporate "send it" into the transcription despite the presence of the warm word "send". Further, in this instance, the location of the warm word "send" may be indicative that it is not intended to cause the assistant command to be performed since additional terms follow "send it" in the spoken utterance.

In additional or alternative implementations, determining whether to incorporate the recognized text into the transcription, or to cause the assistant command to be performed by the automated assistant can be based on a state of the transcription. The state of the transcription can include, for example, whether one or more fields associated with the transcription are populated, whether the recognized text can be utilized to populate one or more fields associated with the transcription, whether the transcription is complete or incomplete, a stability measure for the transcription (e.g., indicative of how stable the transcription is based on measure(s) for one or more of the speech hypotheses utilized in generating the transcription), and/or other information that can represent the state of the transcription. In some implementations, the state of the transcription can be determined based on analyzing a body of the transcription and/or fields associated with the transcription. In some versions of these implementations, in analyzing the transcription, the body of the transcription and/or fields associated with the transcription can be processed using one or more ML models (e.g., language models) that are trained to determine the state of the transcription. In additional or alternative versions of those implementations, in analyzing the transcription, the body of the transcription, fields associated with the transcription can be processed using heuristics to determine the state of the transcription.

For example, assume the user is drafting in an email via an email application that is accessible at the client device. Further assume that the user provides a spoken utterance of "change the subject to yesterday's meeting" as part of a dictation session for drafting the email. In some implementations, "change the subject to yesterday's meeting" may be incorporated into a body of the email, whereas in other implementations, an assistant command of changing a "subject" field associated with the email to "yesterday's meeting" may be performed. For instance, assume the draft email does not include any content in the "subject" field of the email. In this instance, the recognized text corresponding to the spoken utterance may be incorporated into the body of the email without any assistant command being performed since there is no current text in the "subject" field to change. In contrast, assume the draft email does include content of "today's meeting" in the "subject" field of the email. In this instance, the assistant command of changing the "subject" field associated with the email to "yesterday's meeting" may be performed without incorporating any recognized text into the body of the email.

Although particular examples are described herein using particular signals for determining whether to incorporate the recognized text into the transcription, or to cause the assistant command to be performed by the automated assistant, it should be understood that is for the sake of example and is not meant to be limiting. For example, in various implementations, any combination of one or more of the signals for determining whether to incorporate the recognized text into the transcription, or to cause the assistant command to be performed by the automated assistant can be utilized. In these implementations, one or more of the signals described herein can be processed using one or more ML models or rules (e.g., ML rules or heuristically defined rules) to determine whether to incorporate the recognized text into the transcription, or to cause the assistant command to be performed by the automated assistant.

For instance, assume the user is drafting in an email via an email application that is accessible at the client device. Further assume that the user provides a spoken utterance of "send it to Tom" as part of a dictation session for drafting the email. In some implementations, "send it to Tom" may be incorporated into a body of the email, whereas in other implementations, an assistant command of adding a recipient associated with the entity "Tom" may be performed. For instance, assume the user did not provide any touch input when the spoken utterance was received. In this instance, the recognized text corresponding to the spoken utterance may be incorporated into the body of the email without any assistant command being performed if only the touch input is considered. However, assume the state of the transcription indicates the email appears complete, but that a "to" field associated with the email is empty. Accordingly, in this instance, the assistant command of adding a recipient associated with the entity "Tom" may be performed without incorporating any recognized text into the body of the email.

In various implementations, the automated assistant can determine that the transcription is complete. The automated assistant can determine that the transcription is complete based on, for example, the state of the transcription described above indicating that the transcription is complete. In some versions of those implementations, the automated assistant can automatically initiate an interactive editing mode for the transcription. In other versions of those implementations, the automated assistant can initiate the interactive editing mode based on user input. For example, the user can cause the automated assistant to initiate the interactive editing mode based on providing a particular gesture directed to the client device, a spoken utterance that includes one or more particular words or phrases, a selection of a button (e.g., hardware or software) or graphical selectable element displayed at the client device, etc. In the interactive editing mode, spoken utterances that are received from the user of the client device can be utilized to navigate the through the transcription and/or to edit the transcription. For example, assume a transcription includes four paragraphs. The automated assistant, upon initiating the interactive editing mode, can initially highlight a first paragraph of the transcription (or provide some other graphical indication to indicate the automated assistant is focusing editing on the first paragraph of the transcription). The user of the client device can provide spoken utterances that repeat a particular portion of the first paragraphs and how they would like the particular portion of the first paragraph to be edited. For instance, assume the first paragraph is three sentences and the second sentence includes one instance of the word "great". In this example, the user can simply provide a spoken utterance of "all caps 'great' in the second sentence" to cause each character of the instance of "great" to be capitalized. Assuming the user has no other edits to the first paragraph, the user can provide an additional utterance of "next", and the automated assistant can then highlight a second paragraph of the transcription that follows the first paragraph. To return to the first paragraph, the user can provide a further additional utterance of "back" or "return to the first paragraph" to continue editing the first paragraph.

By using techniques described herein, one or more technical advantages can be achieved. As one non-limiting example, the techniques described herein enable the automated assistant to distinguish between spoken utterances (or portions thereof) that are intended to be incorporated into a transcription and spoken utterances (or portions thereof) that are intended to cause an assistant command to be performed. As a result, transcriptions generated using the techniques described herein are more accurate and can result in less manual editing of the transcriptions, thereby reducing a quantity of user inputs received at the client device and conserving computational resources of the client device. Further, a quantity of transcriptions that are prematurely transmitted over one or more networks (e.g., emails, text message, etc.) can be reduced by more accurately identifying and acting upon assistant commands in spoken utterances (or portions thereof), thereby reducing consumption of network resources over one or more of the networks. Moreover, the techniques described herein enable the automated assistant to receive multi-modal input in generating the transcriptions, thereby causing the dictation session to be concluded in quicker and more efficient manner and conserving computational resources of the client device and reducing battery consumption of the client device.

The above description is provided as an overview of only some implementations of the present disclosure. Further description of those implementations, and other implementations, are described in more detail herein. As one non-limiting example, various implementations are described in more detail in the claims and detailed description included herein.

DETAILED DESCRIPTION

Figure 1:
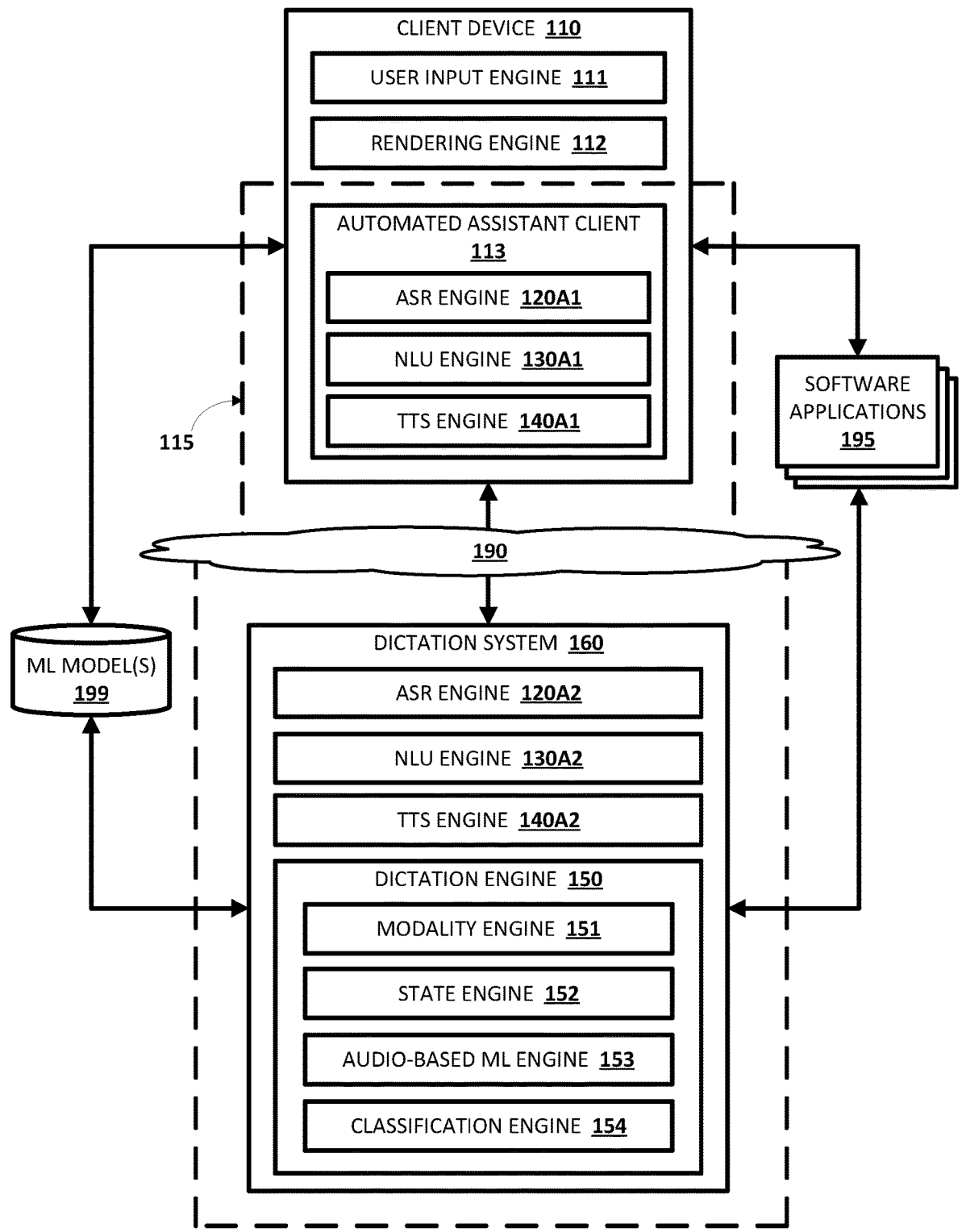
FIG. 1 is a block diagram of an example environment in which implementations disclosed herein may be implemented.

Turning to FIG. 1, a block diagram of an example environment that demonstrates various aspects of the present disclosure, and in which implementations disclosed herein can be implemented is depicted. The example environment includes a client device 110 and a dictation system 160. In some implementations, the dictation system 160 can be implemented locally at the client device 110. In additional or alternative implementations, the dictation system 160 can be implemented remotely from the client device 110 as depicted in FIG. 1. In these implementations, the client device 110 and the dictation system 160 may be communicatively coupled with each other via one or more networks 190, such as one or more wired or wireless local area networks ("LANs," including Wi-Fi LANs, mesh networks, Bluetooth, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute an automated assistant client 113. An instance of the automated assistant client 113 can be an application that is separate from an operating system of the client device 110 (e.g., installed "on top" of the operating system)—or can alternatively be implemented directly by the operating system of the client device 110. The automated assistant client 113 can interact with the dictation system 160 via one or more of the networks 190. The automated assistant client 113 (and optionally by way of its interactions with the dictation system 160) may form what appears to be, from a user's perspective, a logical instance of an automated assistant 115 with which the user may engage in a human-to-computer dialog. An instance of the automated assistant 115 is depicted in FIG. 1, and is encompassed by a dashed line that includes the automated assistant client 113 of the client device 110 and the dictation system 160. It thus should be understood that a user that engages with the automated assistant client 113 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the automated assistant client 113 executing on the client device 110 and/or the dictation system 160.

In various implementations, the client device 110 may include a user input engine 111 that is configured to detect user input provided by a user of the client device 110 using one or more user interface input devices. For example, the client device 110 may be equipped with one or more microphones that detect acoustic (or pressure) waves, such as spoken utterances of the user or other sounds in an environment of the client device 110. Additionally, or alternatively, the client device 110 may be equipped with one or more vision components that are configured to capture and provide signal(s) indicative of movement (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more hardware buttons, etc.) that are configured to capture and provide signal(s) indicative of touch input directed to the client device 110.

In various implementations, the client device 110 may include a rendering engine 112 that is configured to provide content for audible and/or visual presentation to a user of the client device 110 using one or more user interface output devices. For example, the client device 110 may be equipped with one or more speakers that enable content to be provided for audible presentation to the user via the client device 110. Additionally, or alternatively, the client device 110 may be equipped with a display or projector that enables content to be provided for visual presentation to the user via the client device 110.

Further, the client device 110 and/or the dictation system 160 may include one or more memories for storage of data and software applications 195, one or more processors for accessing data and executing the software applications 195, and other components that facilitate communication over one or more of the networks 190. In some implementations, one or more of the software applications 195 can be installed locally at the client device 110, whereas in other implementations one or more of the software applications 195 can be hosted remotely (e.g., by one or more servers) and can be accessible by the client device 110 over one or more of the networks 190.

In some implementations, the operations performed by the automated assistant 115 may be implemented locally at the client device 110. As noted above, in various implementations, the client device 110 may operate the automated assistant client 113. As shown in FIG. 1, the automated assistant client 113 may include an automatic speech recognition (ASR) engine 120A1, a natural language understanding (NLU) engine 130A1, and a text-to-speech (TTS) engine 140A1. In some implementations, the operations performed by the automated assistant 115 may be distributed across multiple computer systems, such as when the dictation system 160 is implemented remotely from the client device 110 as depicted in FIG. 1. In these implementations, the automated assistant 115 may utilize ASR engine 120A2, NLU engine 130A2, and TTS engine 140A2 of the dictation system 160.

Each of these engines may be configured to perform one or more functions. For example, the ASR engine 120A1 and/or 120A2 can process, using ASR model(s) stored in machine learning (ML) model(s) database 199, audio data that captures spoken utterances and that is generated by microphone(s) of the client device 110 to generate ASR output. Further, the NLU engine 130A1 and/or 130A2 can process, using NLU model(s) stored in the ML model(s)

database 199, the ASR output to generate NLU output. Moreover, the TTS engine 140A1 and/or 140A2 can process, using TTS model(s) stored in the ML model(s) database 199, textual data (e.g., text formulated by the automated assistant 115) to generate synthesized speech audio data that includes computer-generated synthesized speech.

In various implementations, the ASR output can include, for example, one or more speech hypotheses that are predicted to correspond to the spoken utterance of the user that is captured in the audio data, one or more corresponding predicted values (e.g., probabilities, log likelihoods, and/or other values) for each of the one or more speech hypotheses, a plurality of phonemes that are predicted to correspond to the spoken utterance of the user that is captured in the audio data, and/or other ASR output. In some versions of those implementations, the ASR engine 120A1 and/or 120A2 can select one or more of the speech hypotheses as recognized text that corresponds to the spoken utterance (e.g., based on the corresponding predicted values).

In various implementations, the NLU output can include, for example, annotated recognized text that includes one or more annotations of the recognized text for one or more (e.g., all) of the terms of the recognized text. For example, the NLU engine 130A1 and/or 130A2 may include a part of speech tagger (not depicted) configured to annotate terms with their grammatical roles. Additionally, or alternatively, the NLU engine 130A1 and/or 130A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity. Additionally, or alternatively, the NLU engine 130A1 and/or 130A2 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine 130A1 and/or 130A2 may rely on annotations from one or more other components of the NLU engine 130A1 and/or 130A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

As described herein, the automated assistant 115 can determine whether to incorporate recognized text corresponding to a spoken utterance of a user of the client device 110 into a transcription displayed at the client device 110 or to cause an assistant command to be performed, that is associated with the transcription and that is based on the recognized text, to be performed by the automated assistant 115 during a dictation session between the user and the automated assistant 115. The automated assistant 115 can make this determination using the dictation engine 150. In various implementations, the dictation engine 150 can include a modality engine 151, a state engine 152, an audio-based ML engine 153, and a classification engine 154 as depicted in FIG. 1.

In some implementations, the modality engine 151 can determine whether touch input is directed to the transcription displayed on the client device 110 when the spoken utterance is received. Put another way, the modality engine 151 can determine whether the user is simultaneously providing both spoken input and touch input during the dictation session, such that the user is engaged in a multi-modal dictation session. The touch input can be considered to be simultaneous with the spoken utterance if the touch input is detected at the same time the spoken utterance is received or within a threshold duration of time of the spoken utterance. In some implementations, and assuming the modality engine 151 determines touch input is directed to the transcription displayed on the client device 110 when the spoken utterance is received, the modality engine 151 can determine one or more regions of a display of the client device 110 to which the touch input is directed. The modality engine 151 can optionally identify metadata associated with one or more of the regions of the display of the client device 110 to which the touch input is directed. For example, the one or more regions of the display of the client device 110 can include one or more textual segments included in the transcription being graphically demarcated by the user (e.g., highlighted, underlined, or otherwise graphically demarcate), one or more fields associated with transcription (e.g., a "to" field, a "from" field, a "subject" field, a "title" field, a "body" of the transcription, etc.), or other regions of the transcription. Further, the metadata associated with one or more of the regions of the display of the client device 110 can include an indication of what text the touch input is being directed to (if any), whether the user selected a particular graphical element displayed along with the transcription, whether the user selected a particular button at the client device 110 (e.g., hardware or software button), and so on. As described herein (e.g., with respect to FIGS. 3, 4A, and 4B), the automated assistant 115 can determine whether to incorporate the recognized text corresponding to the spoken utterance into the transcription or to cause the assistant command to be performed based on the touch input and/or one or more of the regions of the display of the client device 110 to which the touch input is directed.

In additional or alternative implementations, the state engine 152 can determine a state of the transcription and/or a state of one of the software applications 195 associated with the transcription. The state of the transcription can include, for example, whether one or more fields associated with the transcription are populated, whether the recognized text can be utilized to populate one or more fields associated with the transcription, whether the transcription is complete, or a stability measure for the transcription (e.g., indicative of how stable the transcription is based on measure(s) for one or more of the speech hypotheses utilized in generating the transcription). As described herein (e.g., with respect to FIGS. 5, 6A, and 6B), the automated assistant 115 can determine whether to incorporate the recognized text corresponding to the spoken utterance into the transcription or to cause the assistant command to be performed based on the state of the transcription.

In additional or alternative implementations, the audio-based ML engine 153 can process, using one or more audio-based ML models stored in the ML model(s) database 199, the audio data that captures the spoken utterance to determine one or more audio-based characteristics of the spoken utterance. In some implementations, one or more of the audio-based ML models utilized to process the audio data that captures the spoken utterance includes an endpointing model that is trained to detect one or more pauses in the spoken utterance. In these implementations, the one or more pauses can be utilized as the one or more audio-based characteristics of the spoken utterance. Put another way, the one or more pauses, and optionally where the one or more pauses occur in the spoken utterance, may be indicative of whether one or more terms included in the spoken utterance are intended to be incorporated into the transcription or are intended to be cause the assistant command to be performed. In additional or alternative implementations, one or more of the audio-based ML models utilized to process the audio data that captures the spoken utterance includes a warm word model (e.g., an audio keyword classification model) that is trained to detect one or more particular words or phrases (e.g., warm words, such as "send", "set", "change", and others that may be part of the transcription in some instances or cause an assistant command to be performed in other instances) in the spoken utterance. The warm word model(s) can be audio keyword classification model(s) that are trained to detect one or more of the particular words or phrases in the audio data that captures the spoken utterance. For example, the warm word model(s) can be trained to detect a particular word or phrase in the spoken utterance or a subset of particular words or phrases that, when detected, cause the automated assistant 115 to perform a particular action (and optionally bypassing ASR and NLU). The warm word model(s) can additionally or alternatively be text-based classification model(s) that leverage signals from other ML model(s) described herein that process the audio data corresponding to the spoken utterance to detect one or more of the particular words or phrases. For example, the warm word model(s) can be trained to process ASR output, NLU output, endpointing output, and/or any other output from other ML model(s) described herein to detect one or more of the particular words or phrases.

In these implementations, the one or more particular words or phrases can be utilized as the one or more audio-based characteristics of the spoken utterance. Put another way, the one or more particular words or phrases, and optionally where the one or more particular words or phrase occur in the spoken utterance, may be indicative of whether one or more terms included in the spoken utterance are intended to be incorporated into the transcription or are intended to be cause the assistant command to be performed. As described herein (e.g., with respect to FIGS. 7, 8A, and 8B), the automated assistant 115 can determine whether to incorporate the recognized text corresponding to the spoken utterance into the transcription or to cause the assistant command to be performed based on one or more of the audio-based characteristics of the spoken utterance.

In various implementations, the classification engine 154 can process the determinations made by the modality engine 151, the state engine 152, and/or the audio-based ML engine 153 to determine whether to incorporate the recognized text corresponding to the spoken utterance into the transcription or to cause the assistant command to be performed. In some implementations, the classification engine 154 can utilize one or more rules (e.g., ML rules or heuristically defined rules) to process one or more of these determinations to determine whether to incorporate the recognized text corresponding to the spoken utterance into the transcription or to cause the assistant command to be performed. In additional or alternative implementations, the classification engine 154 can process, using a classification model stored in the ML model(s) database 199, one or more of these determinations to determine whether to incorporate the recognized text corresponding to the spoken utterance into the transcription or to cause the assistant command to be performed.

Figure 2:
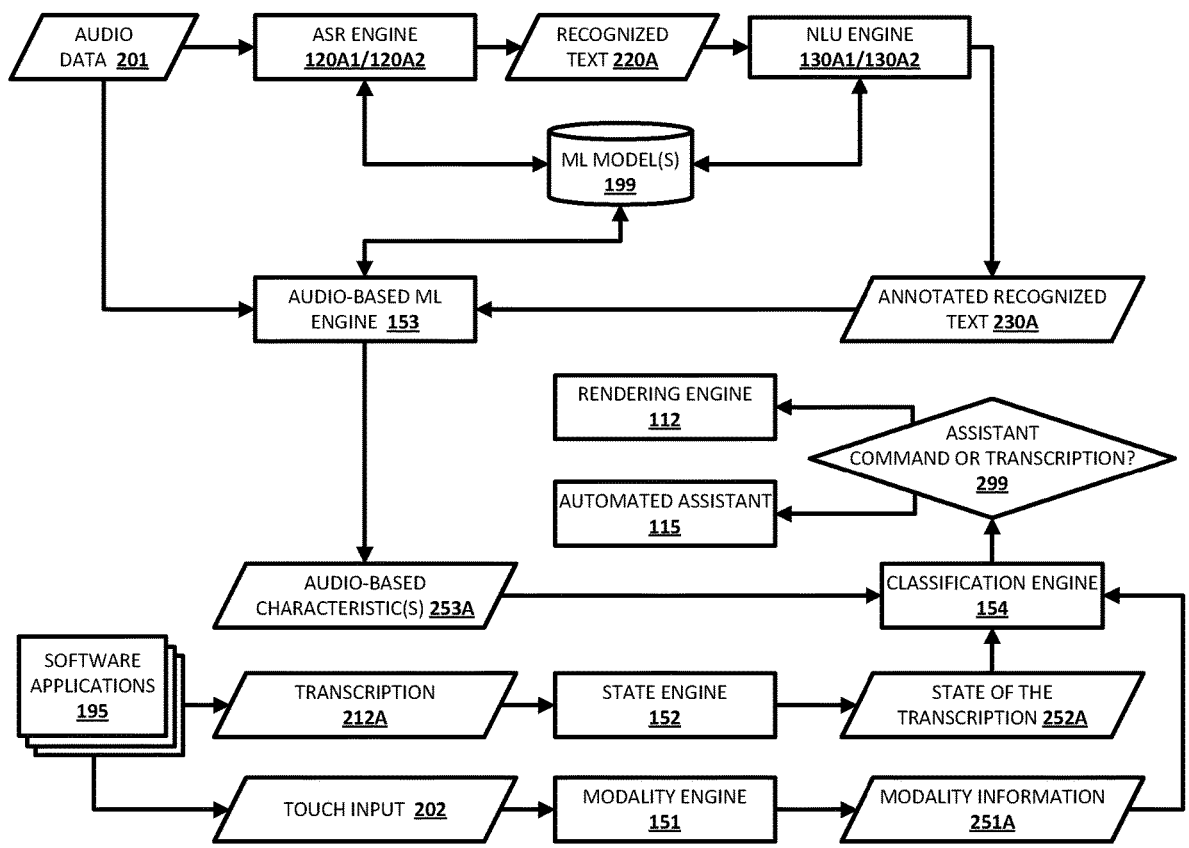
FIG. 2 is an example process flow that utilizes various components from the block diagram of the example environment of FIG. 1, in accordance with various implementations.

For example, and referring to FIG. 2, an example process flow that utilizes various components from the block diagram of the example environment of FIG. 1 is depicted. With respect to FIG. 2, assume audio data 201 that captures a spoken utterance of a user of the client device 110 is generated by microphone(s) of the client device 110. The automated assistant 115 can cause the ASR engine 120A1 and/or 120A2 to process the audio data using ASR model(s) stored in the ML model(s) database 199 to generate ASR output. For instance, and as shown in FIG. 2, the ASR output can include recognized text 220A. The recognized text 220A can include, for example, one or more terms or textual segments that are predicted to correspond to the spoken utterance captured in the audio data 201. Further, the automated assistant 115 can cause the NLU engine 130A1 and/or 130A2 to process the ASR output (e.g., the recognized text 220A) using NLU model(s) stored in the ML model(s) database 199 to generate NLU output. For instance, and as shown in FIG. 2, the NLU output can include annotated recognized text 230A. The annotated recognized text 230A can include, for example, one or more of the terms or textual segments of the recognized text 220A that are annotated with various annotations. The annotations can include, for example, parts of speech for one or more of the terms or textual segments, entities associated with one or more of the terms or textual segments, an indication of whether one or more of the terms or textual segments are predicted to correspond to dictation text or an assistant command, and/or other annotations.

However, in various implementations, the indication of whether one or more of the terms or textual segments are predicted to correspond to dictation text or an assistant command may be insufficient for determining whether to incorporate the recognized text 220A corresponding to the spoken utterance into the transcription or to cause the assistant command to be performed by the automated assistant 115 that is determined based on the recognized text 220A and that is responsive to the spoken utterance. Accordingly, the automated assistant 115 can additionally or alternatively utilize one or more of the various engines of the dictation engine 150 to make this determination.

For example, in some implementations, and assuming that touch input 202 is being directed to the transcription displayed at the client device 110 via one or more of the software applications 195 during the dictation session, the automated assistant 115 can additionally or alternatively cause the modality engine 151 to process the touch input 202 to generate modality information 251A. The modality information 251A can include an indication that the user of the client device 110 is directing the touch input 202 to the transcription displayed at the client device 110 and can optionally include an indication of one or more regions of the transcription that the touch input 202 is directed to. In some versions of those implementations, the modality engine 151 can provide the modality information 251A to the classification engine 154, and the classification engine 154 can determine whether to incorporate the recognized text 220A corresponding to the spoken utterance into the transcription (e.g., using the rendering engine 112) or to cause the assistant command to be performed by the automated assistant 115 that is determined based on the recognized text 220A and that is responsive to the spoken utterance based at least in part on the modality information 251A (e.g., at block 299). Put another way, the classification engine 154 can interpret the touch input 202 as indicated by the modality information 251A in view of the spoken utterance to determine whether to incorporate the recognized text 202A into the transcription displayed at the client device 110 via one or more of the software applications 195 or to cause the assistant command to be performed (e.g., as described with respect to FIGS. 3, 4A, and 4B).

As another example, in additional or alternative implementations, the automated assistant 115 can cause the state engine 152 to process a transcription 212A (e.g., the transcription being displayed at the client device 110) to generate a state of the transcription 252A. As noted above, the state of the transcription 252A can include, for example, whether one or more fields associated with the transcription 212A are populated, whether the recognized text 220A can be utilized to populate one or more fields associated with the transcription 212A, or whether the transcription 212A is complete, and/or other state information associated with the transcription 212A. The state of the transcription 252A can be determined using one or more ML models (e.g., language ML models) or one or more rules (e.g., ML rules or heuristically defined rules). In some versions of those implementations, the state engine 152 can provide the state of the transcription 252A to the classification engine 154, and the classification engine 154 can determine whether to incorporate the recognized text 220A corresponding to the spoken utterance into the transcription 212A (e.g., using the rendering engine 112) or to cause the assistant command to be performed by the automated assistant 115 that is determined based on the recognized text 220A and that is responsive to the spoken utterance based at least in part on the state of the transcription 252A (e.g., at block 299). Put another way, the classification engine 154 can additionally or alternatively interpret the transcription 212A as indicated by the state of the transcription 252A in view of the spoken utterance to determine whether to incorporate the recognized text 202A into the transcription displayed at the client device 110 via one or more of the software applications 195 or to cause the assistant command to be performed (e.g., as described with respect to FIGS. 5, 6A, and 6B).

As yet another example, in additional or alternative implementations, the automated assistant 115 can cause the audio-based ML engine 153 to process the audio data 201 (and optionally the annotated recognized text 230A as shown in FIG. 2) to generate one or more audio-based characteristics 253A of the audio data 201. As noted above, the audio-based ML engine 153 can process the audio data 201 (and optionally the annotated recognized text 230A) using various audio-based ML models stored in the ML model(s) database 199, such as endpointing model(s) trained to detect pause(s) in the spoken utterance captured by the audio data 201, warm word model(s) trained to detect one or more particular words or phrases in the spoken utterance captured by the audio data 201, and/or other audio-based ML model(s). The one or more audio-based characteristics 253A of the audio data 201 can include, for example, an indication of predicted output generated across one or more of these audio-based ML model(s). For instance, the one or more audio-based characteristics 253A can include an indication of one or more pauses included in the spoken utterance and optionally a location of one or more of the pauses in the spoken utterance (e.g., at the beginning of the spoken utterance, in the middle of the spoken utterance, at the end of the spoken utterance, etc.) generated using the endpointing model(s), an indication of whether one or more particular words or phrases (e.g., warm words) are present in the spoken utterance and optionally a location of one or more of the particular words or phrases in the spoken utterance (e.g., at the beginning of the spoken utterance, in the middle of the spoken utterance, at the end of the spoken utterance, etc.) generated using the warm word model(s), and/or other audio-based characteristics of the audio data. In some versions of those implementations, the audio-based ML engine 153 can provide the one or more audio-based characteristics 253A to the classification engine 154, and the classification engine 154 can determine whether to incorporate the recognized text 220A corresponding to the spoken utterance into the transcription 212A (e.g., using the rendering engine 112) or to cause the assistant command to be performed by the automated assistant 115 that is determined based on the recognized text 220A and that is responsive to the spoken utterance based at least in part on the one or more audio-based characteristics 253A (e.g., at block 299). Put another way, the classification engine 154 can interpret the one or more audio-based characteristics 253A of the spoken utterance in view of the transcription to determine whether to incorporate the recognized text 202A into the transcription displayed at the client device 110 via one or more of the software applications 195 or to cause the assistant command to be performed (e.g., as described with respect to FIGS. 7, 8A, and 8B).

Notably, although the classification engine 154 is described herein as making the determination of whether to incorporate the recognized text 202A into the transcription displayed at the client device 110 via one or more of the software applications 195 or to cause the assistant command to be performed based on the modality information 251A, the state of the transcription 252A, or the one or more audio-based characteristics, it should be understood that is for the sake of example and is not meant to be limiting. For example, the classification engine 154 can make this determination based on any combination of the modality information 251A, the state of the transcription 252A, and the one or more audio-based characteristics 253A in making this determination. For instance, the classification engine 154 can process one or more of the modality information 251A, the state of the transcription 252A, and the one or more audio-based characteristics 253A using one or more rules to make this determination, such as determining to perform the assistant command if a majority of these signals indicate the automated assistant should perform the assistant command that is associated with the transcription and that is based on the recognized text 220A. Also, for instance, the classification engine 154 can process one or more of the modality information 251A, the state of the transcription 252A, and the one or more audio-based characteristics 253A using a classification ML model to make this determination, such as processing an indication of one or more of these signals to determine whether the automated assistant 115 should perform the assistant command that is associated with the transcription and that is based on the recognized text 220A.

In various implementations, the automated assistant 115 can determine that the transcription is complete. The automated assistant 115 can determine that the transcription is complete based on, for example, the state of the transcription 252A indicating that the transcription is complete. In some versions of those implementations, the automated assistant 115 can automatically initiate an interactive editing mode for the transcription. In other versions of those implementations, the automated assistant 115 can cause a prompt to be visually and/or audibly presented to the user of the client device 110 that prompts the user to initiate the interactive editing mode, and the automated assistant 115 can initiate the interactive editing mode when the user of the client device 110 provides additional user input responsive to the prompt. In other versions of those implementations, the automated assistant 115 can initiate the interactive editing mode for the transcription in response to receiving a spoken utterance from the user of the client device 110 that requests the automated assistant 115 initiate the interactive editing mode. In other versions of those implementations, the automated assistant 115 can initiate the interactive editing mode for the transcription in response to receiving touch input from the user of the client device 110 that is directed to a graphical selectable element or button (e.g., hardware or software) and that, when selected, causes the automated assistant 115 to initiate the interactive editing mode. In other versions of those implementations, the automated assistant 115 can initiate the interactive editing mode for the transcription in response to receiving a particular gesture (e.g., double tapping the transcription, tracing a particular drawing, particular hand movements, etc.) from the user of the client device 110 that, when received, causes the automated assistant 115 to initiate the interactive editing mode.

In the interactive editing mode, spoken utterances that are received from the user of the client device 110 can be utilized to navigate the through the transcription and/or to edit the transcription. For example, assume a transcription includes four paragraphs. The automated assistant 115, upon initiating the interactive editing mode, can initially highlight a first paragraph of the transcription (or provide some other graphical indication to indicate the automated assistant 115 is focusing editing on the first paragraph of the transcription). The user of the client device 110 can provide spoken utterances that repeat a particular portion of the first paragraphs and how they would like the particular portion of the first paragraph to be edited. For instance, assume the first paragraph is three sentences and the second sentence includes one instance of the word "great". In this example, the user can simply provide a spoken utterance of "bold 'great' in the second sentence" to cause the instance of "great" to be bolded. Assuming the user has no other edits to the first paragraph, the user can provide an additional utterance of "next", and the automated assistant can then highlight a second paragraph of the transcription that follows the first paragraph (or provide some other graphical indication to indicate the automated assistant 115 is focusing editing on the second paragraph of the transcription). If the user wishes to return to editing the first paragraph, the user can provide a spoken utterance of "return to the first paragraph". Although the above example is described with respect to paragraphs, it should be understood that is for the sake of example and is not meant to be limiting. For instance, the techniques described herein can be utilized to navigate through and edit bullet point lists, numbered lists, spreadsheets or tables having rows and/or columns, and so on. In some implementations, the automated assistant 115 may initially highlight a portion of the transcription that is predicted to include spelling or grammatical errors to aid the user in efficiently editing the transcription.

Notably, in the interactive editing mode, the spoken utterances may be presumed to correspond to assistant commands. However, some of these spoken utterances may cause text to be added, edited, or removed from the transcription. Continuing with the above example, when the first paragraph of the transcription is highlighted for editing, the user can provide a spoken utterance of "add a sentence that says 'I love the enthusiasm' to the end". In this example, a sentence of "I love the enthusiasm" can be incorporated as a last sentence of the first paragraph because the first paragraph is the highlighted paragraph being edited. However, some commands may be utilized regardless of what portion of the transcription is being highlighted for editing. For instance, and assuming the transcription corresponds to an email, the user can provide a spoken utterance of "insert my signature block", and a signature block of the user can be appended to the end of the email. Moreover, in the interactive editing mode, other user input may be presumed to correspond to assistant commands (e.g., touch input and/or gestures provided by the user). Continuing with the above example, when the first paragraph of the transcription is highlighted for editing, the user can double tap one or more textual segments. In this example, an assistant command that is associated with the transcription can be performed, such as causing the one or more textual segments to be bolded, underlined, italicized, etc. Although particular assistant commands are described herein, it should be understood that is for the sake of example and is not meant to be limiting. Rather, the assistant commands available for the user may be dependent on the software application associated with the transcription.

By using techniques described herein, one or more technical advantages can be achieved. As one non-limiting example, the techniques described herein enable the automated assistant to distinguish between spoken utterances (or portions thereof) that are intended to be incorporated into a transcription and spoken utterances (or portions thereof) that are intended to cause an assistant command to be performed. As a result, transcriptions generated using the techniques described herein are more accurate and can result in less manual editing of the transcriptions, thereby reducing a quantity of user inputs received at the client device and conserving computational resources of the client device. Further, a quantity of transcriptions that are prematurely transmitted over one or more networks (e.g., emails, text message, etc.) can be reduced by more accurately identifying and acting upon assistant commands in spoken utterances (or portions thereof), thereby reducing consumption of network resources over one or more of the networks. Moreover, the techniques described herein enable the automated assistant to receive multi-modal input in generating the transcriptions, thereby causing the dictation session to be concluded in quicker and more efficient manner and conserving computational resources of the client device and reducing battery consumption of the client device.

Figure 3:
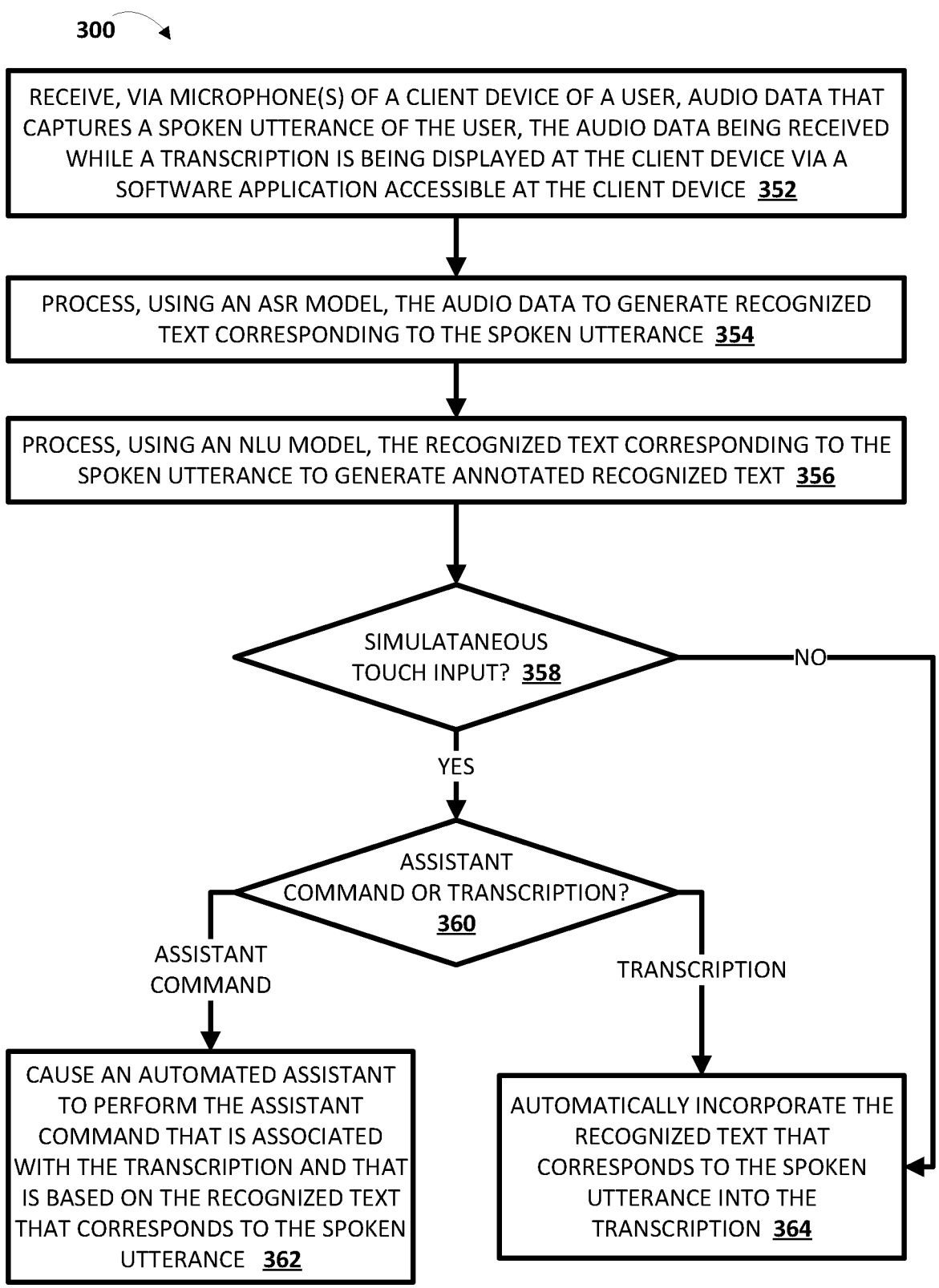
FIG. 3 is a flowchart illustrating an example method of determining, based on multi-modal input of a user, whether to incorporate recognized text into a transcription or to cause an assistant command, that is associated with the transcription and that is based on the recognized text, to be performed, in accordance with various implementations.

Turning now to FIG. 3, a flowchart illustrating an example method 300 of determining, based on multi-modal input of a user, whether to incorporate recognized text into a transcription or to cause an assistant command, that is associated with the transcription and that is based on the recognized text, to be performed is depicted. For convenience, the operations of the method 300 are described with reference to a system that performs the operations. This system of the method 300 includes one or more processors, memory, and/or other component(s) of computing device(s) (e.g., the client device 110 of FIGS. 1, 4A, 4B, 6A, 6B, 8A, and 8B, computing device 910 of FIG. 9, one or more servers, and/or other computing devices). Moreover, while operations of the method 300 are shown in a particular order, this is not meant to be limiting. One or more operations may be reordered, omitted, and/or added.

At block 352, the system receives, via one or more microphones of a client device of a user, audio data that captures a spoken utterance of the user, the audio data being received while a transcription is being displayed at the client device via a software application accessible at the client device. The spoken utterance can be received as part of a dictation session between the user and an automated assistant implemented at least in part at the client device. Further, the spoken utterance can initiate the dictation session (e.g., "Hey assistant, send a text to Alex "Did you send it to Julia?") or can be part of an ongoing dictation session.

At block 354, the system processes, using an automatic speech recognition (ASR) model, the audio data to generate recognized text corresponding to the spoken utterance. In some implementations, the system may only process the audio data using the ASR model in response to determining the automated assistant has been invoked via detection of one or more particular words or phrases in the spoken utterance or a preceding spoken utterance that invoke the automated assistant (e.g., hot words, such as "Assistant", "Hey Assistant", and others that may invoke the automated assistant), actuation of a hardware or software button that invokes the automated assistant, detection of one or more gestures in vision data (e.g., hand movement, lip movement, and/or eye gaze directed to the client device and captured by vision component(s) of the client device) that invoke the automated assistant, and/or any other means for invoking the automated assistant. In some versions of those implementations, the automated assistant may need not be re-invoked during the remainder of the dictation session. In additional or alternative implementations, the automated assistant may need not be invoked to initiate the dictation session or during the dictation session (and optionally based on the user of the client device consenting to the automated assistant processing spoken utterances detected at the client device). In some implementations, the system can additionally or alternatively generate other ASR output (e.g., as described above with respect to the ASR engine 120A1 and/or 120A2 of FIG. 1).

At block 356, the system processes, using a natural language understanding (NLU) model, the recognized text corresponding to the spoken utterance to generate annotated recognized text. The annotated recognized text can include, for example, one or more of the terms or textual segments of the recognized text that are annotated with various annotations. The annotations can include, for example, parts of speech for one or more of the terms or textual segments, entities associated with one or more of the terms or textual segments, an indication of whether one or more of the terms or textual segments are predicted to correspond to dictation text or an assistant command, and/or other annotations. In some implementations, the system can additionally or alternatively generate other NLU output (e.g., as described above with respect to the NLU engine 130A1 and/or 130A2 of FIG. 1).

At block 358, the system determines whether simultaneous touch input directed to the transcription is received at the client device when the audio data corresponding to the spoken utterance is received at block 352. The touch input can be received at a display of the client device via a touch screen, a stylus, a mouse and/or pointer, etc. The touch input can be considered to be simultaneous with the spoken utterance if the touch input is detected at the same time the spoken utterance is received or within a threshold duration of time of the spoken utterance. Further, the touch input can be directed to one or more regions of the transcription. For example, the one or more regions of the display of the transcription can include one or more textual segments included in the transcription being graphically demarcated by the user (e.g., highlighted, underlined, or otherwise graphically demarcate), one or more fields associated with transcription (e.g., a "to" field, a "from" field, a "subject" field, a "title" field, a "body" of the transcription, etc.), or other regions of the transcription. If, at an iteration of block 358, the system determines no simultaneous touch input is received at the client device, then the system proceeds to block 364. Block 364 is described below. If, at an iteration of block 358, the system determines simultaneous touch input is received at the client device, then the system proceeds to block 360.

At block 360, the system determines whether to incorporate the recognized text, that corresponds to the spoken utterance, into the transcription or to perform an assistant command that is associated with the transcription and that is based on the recognized text that corresponds to the spoken utterance. The system can determine whether to incorporate the recognized text into the transcription or to cause the assistant command to be performed based on the touch input and the spoken utterance. If, at an iteration of block 360, the system determines to perform the assistant command that is associated with the transcription and that is based on the recognized text that corresponds to the spoken utterance, then the system proceeds to block 362. At block 362, the system causes an automated assistant to perform the assistant command that is associated with the transcription and that is based on the recognized text that corresponds to the spoken utterance. For example, assume the transcription is an email, assume the spoken utterance received during the dictation session corresponds to "send it to Scott H", and assume the user has directed touch input to a "to" field associated with the email. In this example, the system may determine that the spoken utterance provided by the user is intended to be an assistant command of adding a recipient of "Scott H" for the email. Accordingly, the system can proceed to block 362 and cause an email address associated with the recipient of "Scott H" to be added to the "to" field of the email.

If, at an iteration of block 360, the system determines to incorporate the recognized text that corresponds to the spoken utterance into the transcription, then the system proceeds to block 364. At block 364, the system automatically incorporates the recognized text that corresponds to the spoken utterance into the transcription. For example, again assume the transcription is an email, and assume the spoken utterance received during the dictation session corresponds to "send it to Scott H". However, in this example, assume no touch input is being directed to the email. In contrast with the above example, if the touch input is not directed to the "to" field associated with the email, then "send it to Scott H" may be incorporated into a body of the email as part of the transcription.

Figure 4A:
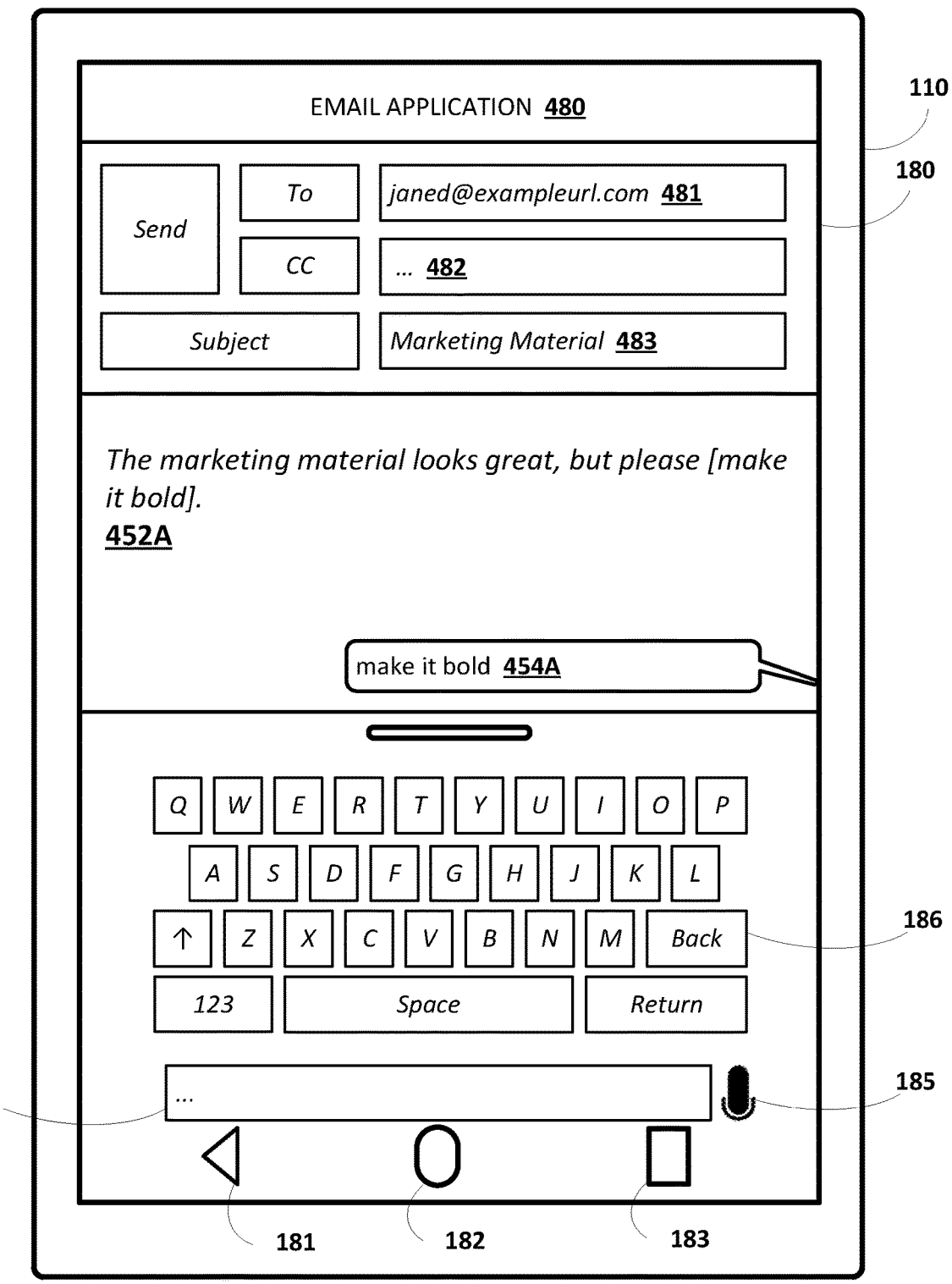
FIG. 4A and FIG. 4B illustrate various non-limiting examples of determining whether to incorporate the recognized text into the transcription or to cause the assistant command to be performed utilizing the method of FIG. 3, in accordance with various implementations.
Figure 4B:
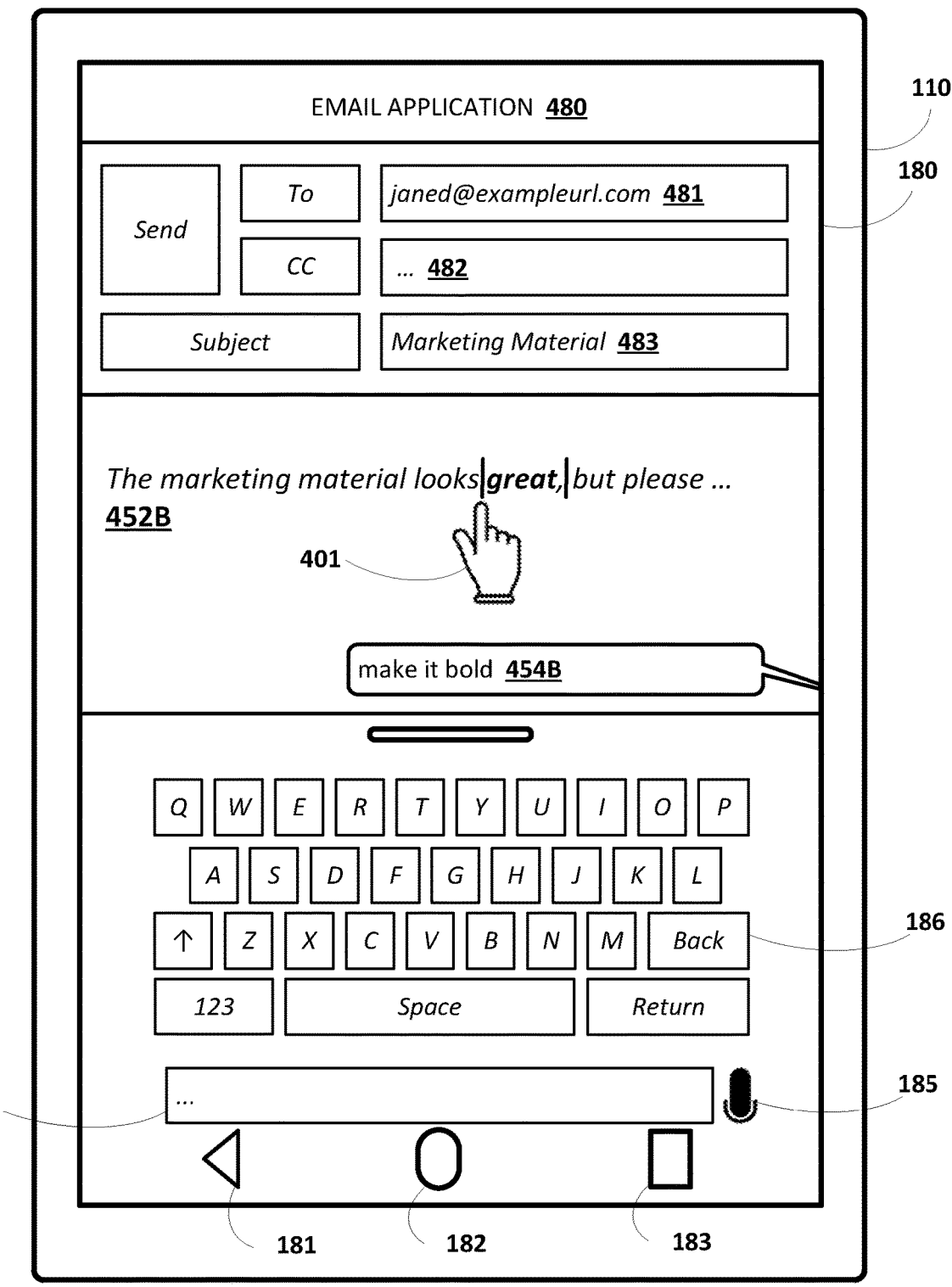

Turning now to FIGS. 4A and 4B, various non-limiting examples of determining whether to incorporate the recognized text into the transcription or to cause the assistant command to be performed utilizing the method 300 of FIG. 3 are depicted. An automated assistant can be implemented at least in part at the client device 110 (e.g., the automated assistant 115 described with respect to FIG. 1). The automated assistant can utilize a dictation system (e.g., the dictation system 160 described with respect to FIG. 1) to determine whether to incorporate the recognized text into the transcription or cause the assistant command to be performed based on the recognized text based on the multi-modal input of the user and the spoken utterance (e.g., as described with respect to the method 300 of FIG. 3).

The client device 110 depicted in FIGS. 4A and 4B may include various user interface components including, for example, microphone(s) to generate audio data based on spoken utterances and/or other audible input, speaker(s) to audibly render synthesized speech and/or other audible output, and a display 180 to receive touch input and/or to visually render transcriptions and/or other visual output. Further, the display 180 of the client device 110 includes various system interface elements 181, 182, and 183 (e.g., hardware and/or software interface elements) that may be interacted with by the user of the client device 110 to cause the client device 110 to perform one or more actions. The display 180 of the client device 110 enables the user to interact with content rendered on the display 180 by touch input (e.g., by directing user input to the display 180 or portions thereof (e.g., to text entry box 184, to keyboard 186, or to other portions of the display 180)) and/or by spoken input (e.g., by selecting microphone interface element 185—or just by speaking without necessarily selecting the microphone interface element 185 (i.e., the automated assistant may monitor for one or more terms or phrases, gesture(s) gaze(s), mouth movement(s), lip movement(s), and/or other conditions to activate spoken input) at the client device 110).

Referring specifically to FIG. 4A, assume that a user of the client device 110 is utilizing an email application 480 that is accessible at the client device 110 to draft an email. In this example, the email can correspond to the transcription, and the email can include a body 452A and various fields, such as a "to" field 481 that is populated with a recipient email "janed@exampleurl.com", a "cc" field 482 that is not populated, and a "subject" field 483 that is populated with the subject "Marketing Material". Further assume that the body 452A of the email already includes text of "The marketing material looks great, but please . . . " before any additional spoken or textual input is received during a dictation session with the automated assistant in drafting the email. Moreover, assume that the user of the client device 110 provides a spoken utterance 454A of "make it bold" (and optionally in response to selection of the microphone interface element 185 or any other means of invoking the automated assistant). Notably, in the example of FIG. 4A, no touch input of the user of the client device 110 is being directed to the transcription of the email. For instance, there is no indication that any touch input of the user of the client device 110 is being directed to the body 452A of the transcription of the email or any of the fields 481, 482, or 483 associated with the transcription. Accordingly, in this example, the automated assistant may determine that recognized text corresponding to the spoken utterance 454A of "make it bold" should be incorporated into the transcription as indicated by "make it bold" being offset in brackets in the body 452A of the email.

In contrast, and referring specifically to FIG. 4B, again assume that the user of the client device 110 is utilizing the email application 480 that is accessible at the client device 110 to draft the email as described above with respect to FIG. 4A. Further assume that the user of the client device 110 provides a spoken utterance 454B of "make it bold" (and optionally in response to selection of the microphone interface element 185 or any other means of invoking the automated assistant). However, in the example of FIG. 4B, touch input of the user of the client device 110 is being directed to the transcription of the email (e.g., as indicated by hand 401 graphically demarcating a textual segment of "great" in a body 454B of the email). For instance, there is touch input of the user of the client device 110 is highlighting the textual segment of "great" in the body 452B of the email when the spoken utterance 454B is provided by the user. Accordingly, in this example, the automated assistant may determine that an assistant command that is associated with the transcription and that is determined based on the recognized text corresponding to the spoken utterance 454B of "make it bold" should be performed. As a result, the highlighted textual segment of "great" can be bolded as shown in the body of the transcription in FIG. 4B.

Notably, the spoken utterance 454A of FIG. 4A and the spoken utterance 454B of FIG. 4B both correspond to the same utterance—"make it bold". However, the automated assistant makes different determinations in these examples for whether to incorporate the recognized text into the email (e.g., as described with respect to FIG. 4A) or to perform the assistant command associated with the transcription (e.g., as described with respect to FIG. 4B) based on the multi-modal input of the user during the dictation session. Although the examples of FIGS. 4A and 4B are described with respect to the dictation session occurring with respect to the email application 480, and with respect to a particular assistant command that is associated with the transcription being performed, it should be understood that is for the sake of example and is not meant to be limiting.

For example, the dictation session can occur with respect to any software application that is accessible at the client device 110 and that can utilize dictation. For instance, the software application can additionally or alternatively be a text messaging application, a notes application, a calendar application, an automated assistant application that can generate text for other software applications accessible at the client device 110 based on touch and/or spoken input and transmit the generated text to those other software applications accessible at the client device 110, and/or any other software application accessible at the client device 110. Notably, transcriptions associated with these various can be associated with different fields. For instance, as shown in FIGS. 4A and 4B, the email application shown in FIGS. 4A and 4B includes the "to" field 481, the "cc" field 482, and the "subject" field 483. Also, for instance, a text messaging application may be included with a "to" or "recipient" field, but no "cc" field or "subject" field, a notes application may include a "title" field or "date" field, but none of the fields depicted in FIGS. 4A and 4B. Accordingly, it should be understood that the fields associated with a given software application may be based on the given software application being utilized. As a result, the assistant commands associated with the transcription may also vary from one software application to the next based on the fields and selected textual segments.

For instance, in the example of FIGS. 4A and 4B, the user can additionally or alternatively provide spoken utterances that include other assistant commands to modify the selected textual segment of "great" in various manners, such as by providing spoken utterances of "underline it", "italicize it", "highlight it", "capitalize it", "change color of text to red", and/or any other spoken utterance that includes an assistant command to otherwise manipulate the appearance of the selected textual segment of "great". Also, for instance, the user can additionally or alternatively provide spoken utterances that include other assistant commands to punctuate, format, or edit the transcription in various manners, such as by selecting a region of the transcription (e.g., a field associated with the transcription or a body of the transcription) and providing spoken utterances of "add period", "add comma", "insert line", "new paragraph", "new bullet point", and/or any other spoken utterance that includes an assistant command to otherwise punctuate, format, or edit the transcription. Also, for instance, the user can additionally or alternatively provide spoken utterances that include other assistant commands to populate or re-populate fields associated with the transcription in various manners, such as by selecting a field associated with the transcription and providing spoken utterances of "send to [recipient]", "cc [recipient]", "set subject to [subject]", "change subject to [subject]", "date [date]", "send on [date and/or time]", "set title to [title]", and/or any other spoken utterance that includes an assistant command to otherwise populate or re-populate any fields associated with the transcription.

In some implementations, the automated assistant may bias the determination of whether to incorporate the recognized text into the transcription or to cause the assistant command to be performed based on the fields associated with transcription. For instance, if the spoken utterance 454B provided by the user in the example of FIG. 4B was "change the date to May 1, 2021", then the automated assistant would likely incorporate the corresponding recognized text into the body of the transcription since there is no "date" field associated with the email application 480 in the example of FIG. 4B (and regardless of whether the user has provided simultaneous touch input directed to one of the fields or one or more textual segments of the body 452B). However, if the same spoken utterance is provided while the user of the client device 110 is dictating a calendar entry, then the automated assistant would likely cause an assistant command that sets a date associated with the calendar entry to "May 1, 2021" to be performed. Notably, this biasing can be utilized whether or not the user of the client device 110 is providing the multi-modal input (e.g., such as with respect to the examples described with respect to FIGS. 6A, 6B, 8A, and 8B).

Figure 5:
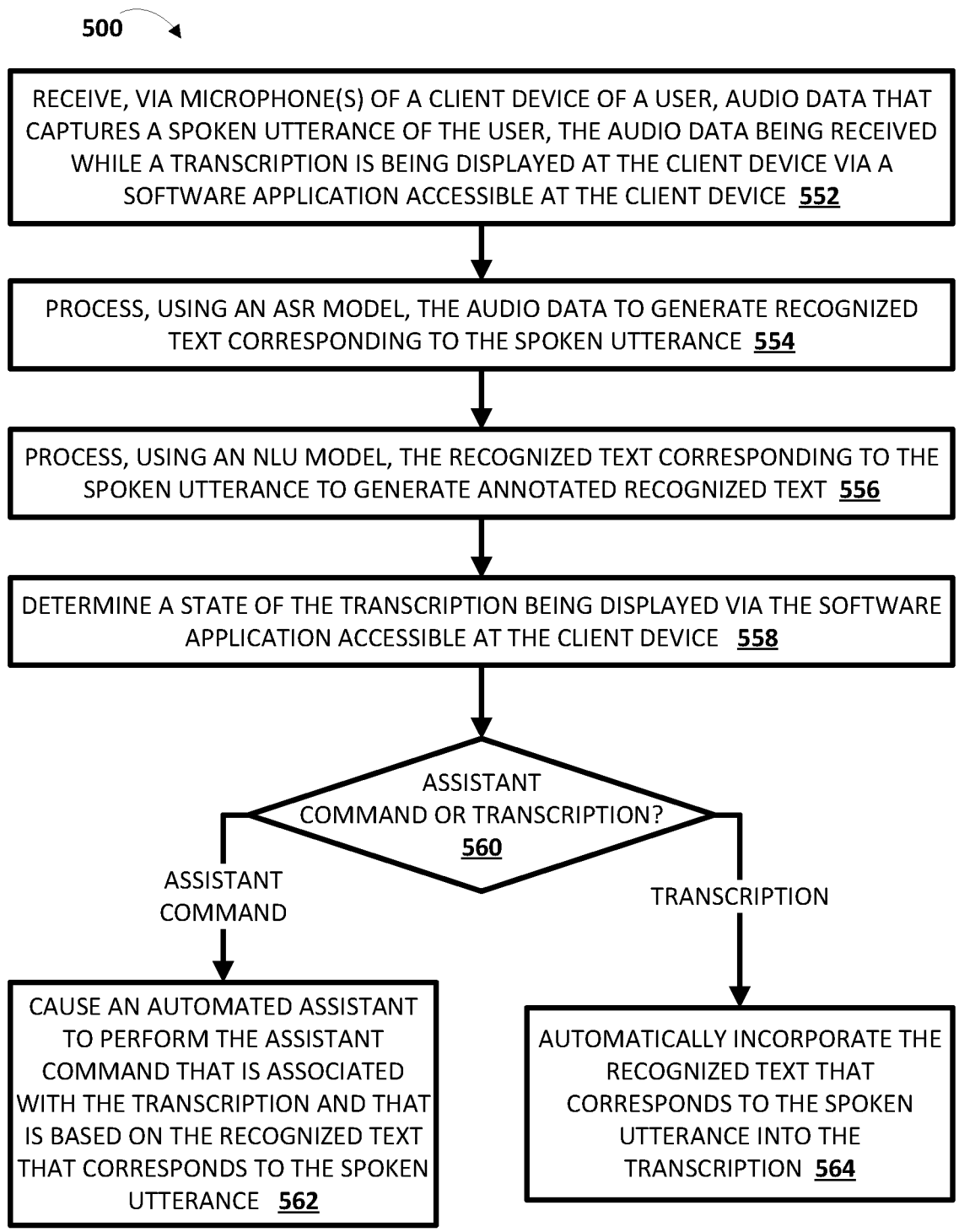
FIG. 5 is a flowchart illustrating an example method of determining, based on a state of a transcription, whether to incorporate recognized text into a transcription or to cause an assistant command, that is associated with the transcription and that is based on the recognized text, to be performed, in accordance with various implementations.

Turning now to FIG. 5, a flowchart illustrating an example method 500 of determining, based on a state of a transcription, whether to incorporate recognized text into a transcription or to cause an assistant command, that is associated with the transcription and that is based on the recognized text, to be performed is depicted. For convenience, the operations of the method 500 are described with reference to a system that performs the operations. This system of the method 500 includes one or more processors, memory, and/or other component(s) of computing device(s) (e.g., the client device 110 of FIGS. 1, 4A, 4B, 6A, 6B, 8A, and 8B, computing device 910 of FIG. 9, one or more servers, and/or other computing devices). Moreover, while operations of the method 500 are shown in a particular order, this is not meant to be limiting. One or more operations may be reordered, omitted, and/or added.

At block 552, the system receives, via one or more microphones of a client device of a user, audio data that captures a spoken utterance of the user, the audio data being received while a transcription is being displayed at the client device via a software application accessible at the client device. At block 554, the system processes, using an automatic speech recognition (ASR) model, the audio data to generate recognized text corresponding to the spoken utterance. At block 556, the system processes, using a natural language understanding (NLU) model, the recognized text corresponding to the spoken utterance to generate annotated recognized text. The system can perform the operations of blocks 552, 554, and 556 of FIG. 5 in the same or similar manner described above with respect to the operations of block 352, 354, and 356 of FIG. 3, respectively.

At block 558, the system determines a state of the transcription being displayed via the software application at the client device. The state of the transcription can include, for example, whether one or more fields associated with the transcription are populated, whether the recognized text can be utilized to populate one or more fields associated with the transcription, whether the transcription is complete or incomplete (e.g., whether one or more of the fields associated with the transcription being populated, whether a body of the transcription is complete, etc.), a stability measure for the transcription (e.g., indicative of how stable the transcription is based on measure(s) for one or more of the speech hypotheses utilized in generating the transcription), and/or other state information associated with the transcription. In some implementations, the state of the transcription can be determined based on analyzing the transcription. In some versions of these implementations, in analyzing the transcription, the system can process the transcription using one or more ML models that are trained to determine the state of the transcription (e.g., one or more language models). In additional or alternative versions of those implementations, in analyzing the transcription, the system can process the transcription using heuristics to determine the state of the transcription.

At block 560, the system determines whether to incorporate the recognized text, that corresponds to the spoken utterance, into the transcription or to perform an assistant command that is associated with the transcription and that is based on the recognized text that corresponds to the spoken utterance. The system can determine whether to incorporate the recognized text into the transcription or to cause the assistant command to be performed based on the state of the transcription. If, at an iteration of block 560, the system determines to perform the assistant command that is associated with the transcription and that is based on the recognized text that corresponds to the spoken utterance, then the system proceeds to block 562. At block 562, the system causes an automated assistant to perform the assistant command that is associated with the transcription and that is based on the recognized text that corresponds to the spoken utterance. For example, assume the transcription is an email, assume the spoken utterance received during the dictation session corresponds to "send it to Scott H", and assume the state of the transcription indicates the body of the email is complete, but a "to" field of the email is empty. In this example, the system may determine that the spoken utterance provided by the user is intended to be an assistant command of adding a recipient of "Scott H" for the email. Accordingly, the system can proceed to block 562 and cause an email address associated with the recipient of "Scott H" to be added to the "to" field of the email.

If, at an iteration of block 560, the system determines to incorporate the recognized text that corresponds to the spoken utterance into the transcription, then the system proceeds to block 564. At block 564, the system automatically incorporates the recognized text that corresponds to the spoken utterance into the transcription. For example, again assume the transcription is an email, and assume the spoken utterance received during the dictation session corresponds to "send it to Scott H". However, in this example, assume the state of the transcription indicates the body of the email is incomplete (and optionally regardless of whether the "to" field is populated or unpopulated). In contrast with the above example, "send it to Scott H" may be incorporated into a body of the email as part of the transcription.

Figure 6A:
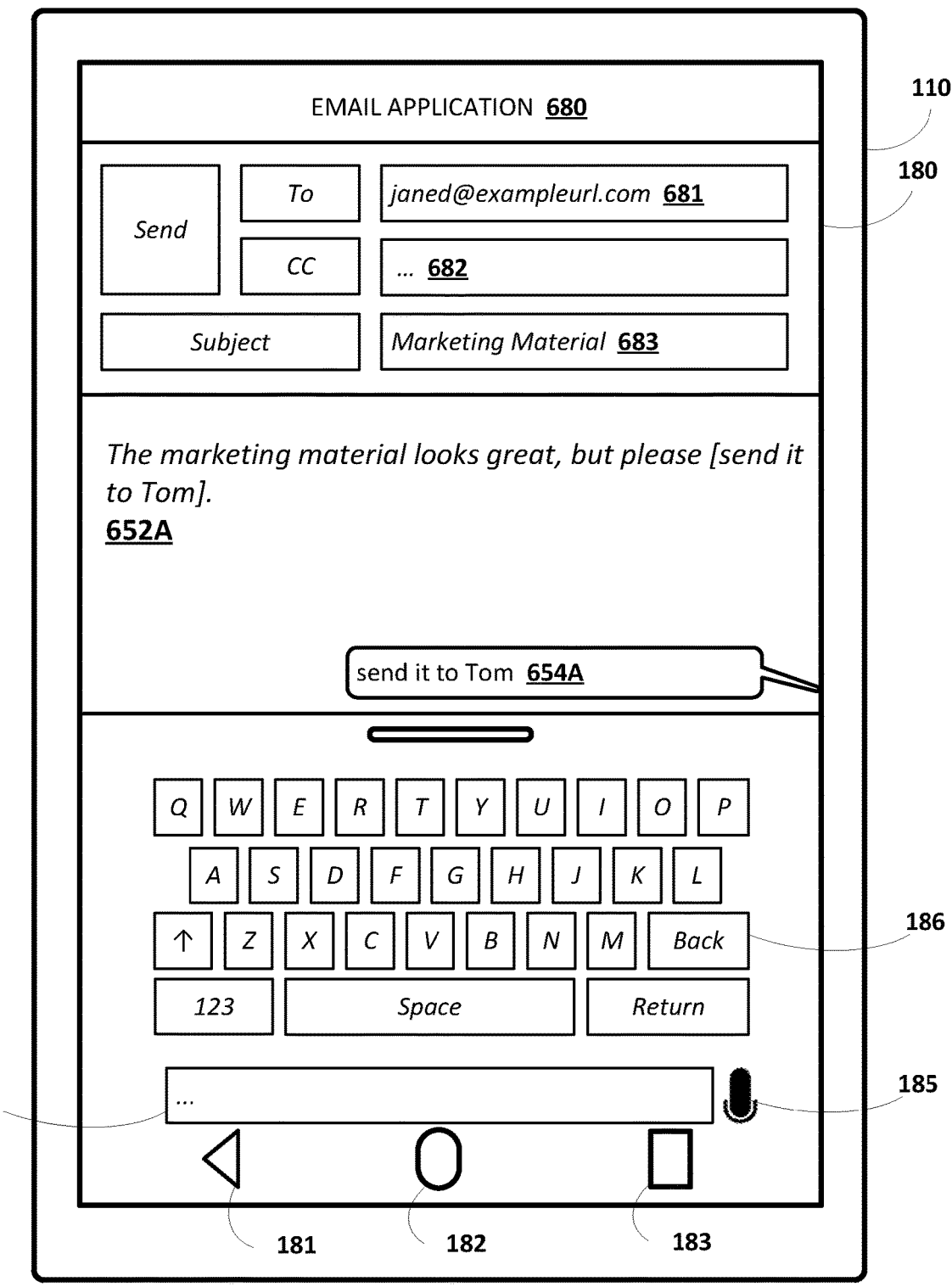
FIG. 6A and FIG. 6B illustrate various non-limiting examples of determining whether to incorporate the recognized text into the transcription or to cause the assistant command to be performed utilizing the method of FIG. 5, in accordance with various implementations.
Figure 6B:
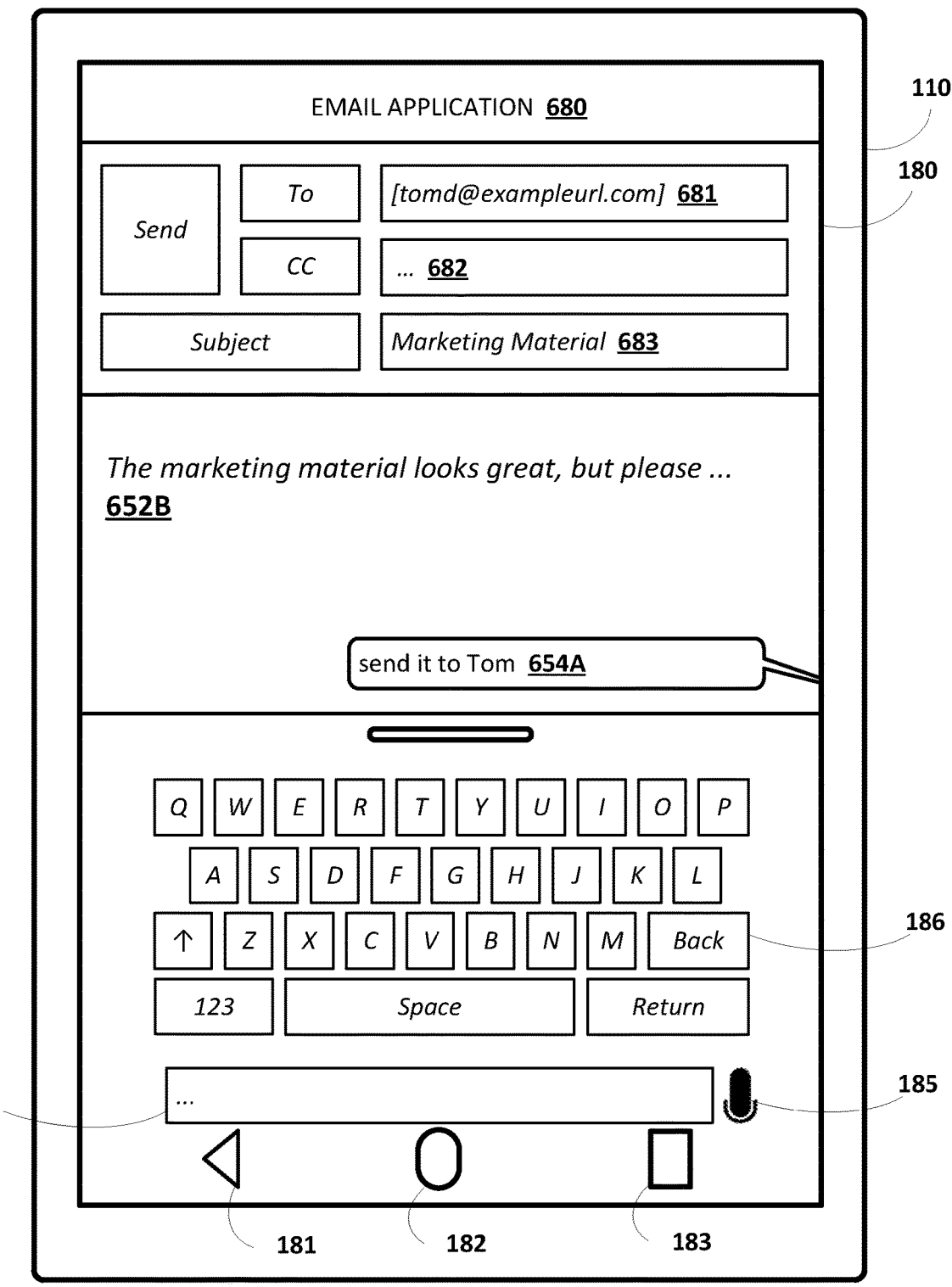

Turning now to FIGS. 6A and 6B, various non-limiting examples of determining whether to incorporate the recognized text into the transcription or to cause the assistant command to be performed utilizing the method 500 of FIG. 5 are depicted. An automated assistant can be implemented at least in part at the client device 110 (e.g., the automated assistant 115 described with respect to FIG. 1). The automated assistant can utilize a dictation system (e.g., the dictation system 160 described with respect to FIG. 1) to determine whether to incorporate the recognized text into the transcription or cause the assistant command to be performed based on the recognized text based on the state of the transcription and the spoken utterance (e.g., as described with respect to the method 500 of FIG. 5). The client device 110 depicted in FIGS. 6A and 6B may be the same or substantially similar to the client device 110 described above with respect to FIGS. 4A and 4B.

Referring specifically to FIG. 6A, assume that a user of the client device 110 is utilizing an email application 680 that is accessible at the client device 110 to draft an email. In this example, the email can correspond to the transcription, and the email can include a body 652A and various fields, such as a "to" field 681 that is populated with a recipient email "janed@exampleurl.com", a "cc" field 682 that is not populated, and a "subject" field 683 that is populated with the subject "Marketing Material". Further assume that the body 452A of the email already includes text of "The marketing material looks great, but please . . . " before any additional spoken or textual input is received during a dictation session with the automated assistant in drafting the email. Moreover, assume that the user of the client device 110 provides a spoken utterance 654A of "send it to Tom" (and optionally in response to selection of the microphone interface element 185 or any other means of invoking the automated assistant). Notably, in the example of FIG. 6A, no touch input of the user of the client device 110 is being directed to the transcription of the email. For instance, there is no indication that any touch input of the user of the client device 110 is being directed to the body 652A of the transcription of the email or any of the fields 681, 682, or 683 associated with the transcription. Moreover, in the example of FIG. 6A, the "to" field 681 is already populated with a recipient email "janed@exampleurl.com". As a result, a state of the transcription determined by the automated assistant may indicate that the email is associated with the "to" field 681, but that the "to" field 681 is already populated. Accordingly, in this example, the automated assistant may determine that recognized text corresponding to the spoken utterance 654A of "send it to Tom" should be incorporated into the transcription as indicated by "send it to Tom" being offset in brackets in the body 652A of the email.

In contrast, and referring specifically to FIG. 6B, again assume that the user of the client device 110 is utilizing the email application 680 that is accessible at the client device 110 to draft the email as described above with respect to FIG. 6A. Further assume that the user of the client device 110 provides a spoken utterance 454B of "sent it to Tom" (and optionally in response to selection of the microphone interface element 185 or any other means of invoking the automated assistant). However, in the example of FIG. 6B, assume the "to" field 681 was not previously populated with "janed@exampleurl.com" when the spoken utterance 654B was provided. As a result, a state of the transcription determined by the automated assistant may indicate that the email is associated with the "to" field 681 and that the "to" field 681 is not populated. Accordingly, in this example, the automated assistant may determine that recognized text corresponding to the spoken utterance 654B of "send it to Tom" should cause an assistant command to be performed, such as adding a recipient email for a contact entry of "Tom" as indicated by the email address "tomd@exampleurl.com" being offset in brackets in the "to" field 681 associated with the email in the example of FIG. 6A.

Notably, the spoken utterance 654A of FIG. 6A and the spoken utterance 654B of FIG. 6B both correspond to the same utterance—"send it to Tom". However, the automated assistant makes different determinations in these examples for whether to incorporate the recognized text into the email (e.g., as described with respect to FIG. 6A) or to perform the assistant command associated with the transcription (e.g., as described with respect to FIG. 6B) based on the state of the transcription. Although the examples of FIGS. 6A and 6B are described with respect to determining whether to add a recipient to an email address solely based on the state of the transcription, it should be understood that is for the sake of example and is not meant to be limiting. For example, assume the state of the transcription indicates that the "to" field 681 of the email is already populated when the spoken utterance 652A is received. However, further assume the user of the client device 110 is directing simultaneous touch input to the "to" field 681 of the email. In this example, a recipient email for a contact entry of "Tom" as indicated by the email address "tomd@exampleurl.com" may be added to the email despite the state of the transcription indicating that the "to" field 681 is already populated. Accordingly, the automated assistant can consider additional or alternative signals in making the determination of whether to incorporate the recognized text into the transcription or to cause the assistant command, that is associated with the transcription and that is based on the recognized text, to be performed.

Moreover, although FIGS. 6A and 6B are described with respect to the state of the transcription being determined based on whether fields associated with the email are populated, it should be understood that is for the sake of example and is not meant to be limiting. For example, the spoken utterances 654A and 654B of "send it to Tom" may also be associated with an assistant command that causes the email to be transmitted from the client device 110 to an additional client device associated with "Tom". However, in the examples of FIGS. 6A and 6B, the state of the transcription may also indicate that the transcription is incomplete. The automated assistant can determine that the transcription is incomplete based on processing the transcription (e.g., the body 652A and/or 652B, the fields 681, 682, and/or 683, and/or any textual segments associated therewith) using one or more ML models, rules, or heuristics that can be utilized to determine the state of the transcription. In processing the body 652A and/or 652B and/or the fields 681, 682, and/or 683 of FIGS. 6A and 6B, the automated assistant can determine that the transcription is incomplete based on grammatical issues with the body 652A and/or 652B prior to the spoken utterance 654A and/or 654B being received, and namely that the body 652A and/or 652B is an incomplete sentence. Accordingly, the automated assistant may refrain from causing the email to be transmitted to the additional client device associated with the recipient "Tom" in response to receiving the spoken utterance 654A and/or 654B.

Figure 7:
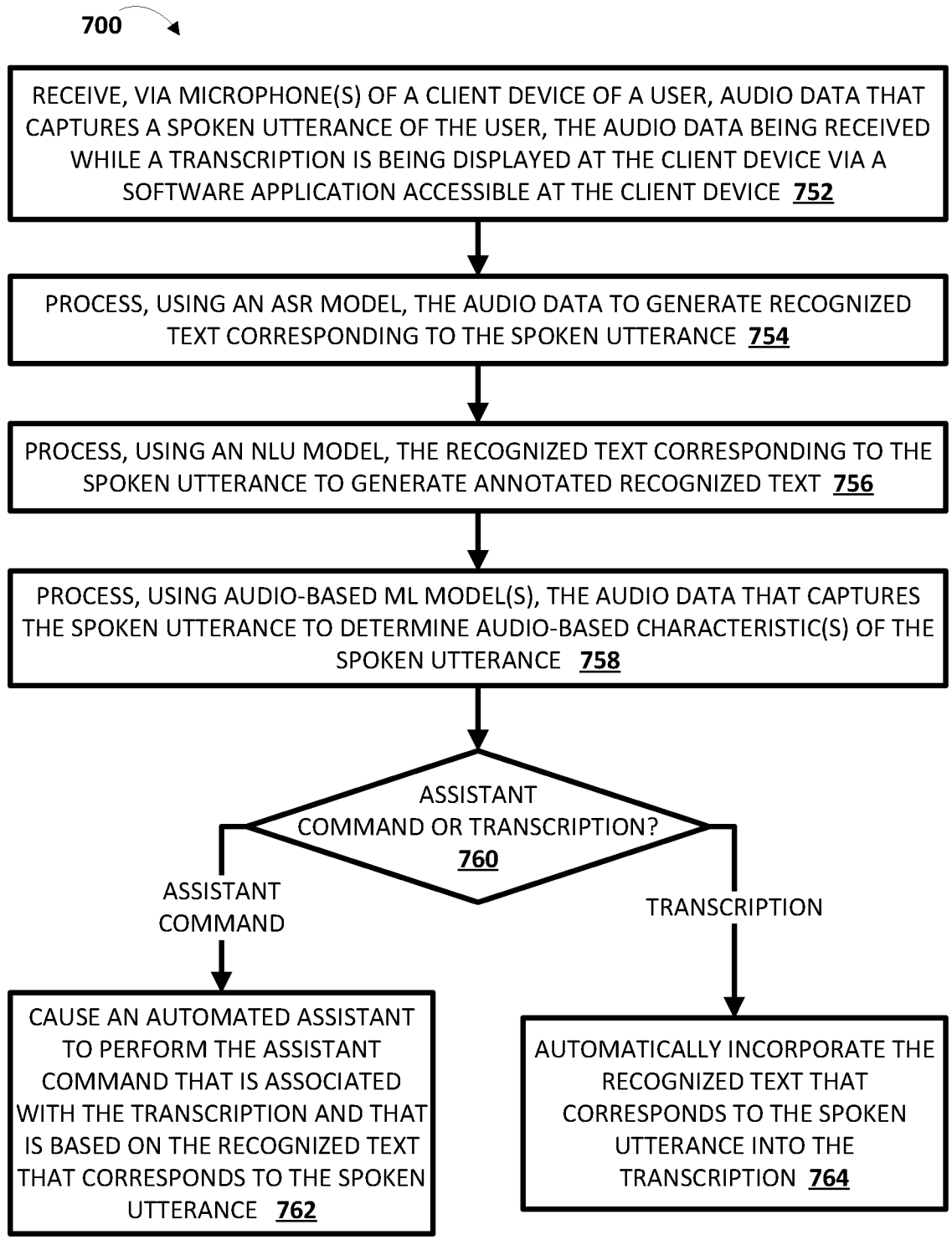
FIG. 7 is a flowchart illustrating an example method of determining, based on at least one or more audio-based characteristics of a spoken utterance, whether to incorporate recognized text into a transcription or to cause an assistant command, that is associated with the transcription and that is based on the recognized text, to be performed, in accordance with various implementations.

Turning now to FIG. 7, a flowchart illustrating an example method 700 of determining, based on at least one or more audio-based characteristics of a spoken utterance, whether to incorporate recognized text into a transcription or to cause an assistant command, that is associated with the transcription and that is based on the recognized text, to be performed is depicted. For convenience, the operations of the method 700 are described with reference to a system that performs the operations. This system of the method 700 includes one or more processors, memory, and/or other component(s) of computing device(s) (e.g., the client device 110 of FIGS. 1, 4A, 4B, 6A, 6B, 8A, and 8B, computing device 910 of FIG. 9, one or more servers, and/or other computing devices). Moreover, while operations of the method 700 are shown in a particular order, this is not meant to be limiting. One or more operations may be reordered, omitted, and/or added.

At block 752, the system receives, via one or more microphones of a client device of a user, audio data that captures a spoken utterance of the user, the audio data being received while a transcription is being displayed at the client device via a software application accessible at the client device. At block 754, the system processes, using an automatic speech recognition (ASR) model, the audio data to generate recognized text corresponding to the spoken utterance. At block 756, the system processes, using a natural language understanding (NLU) model, the recognized text corresponding to the spoken utterance to generate annotated recognized text. The system can perform the operations of blocks 752, 554, and 756 of FIG. 7 in the same or similar manner described above with respect to the operations of block 352, 354, and 356 of FIG. 3, respectively.

At block 758, the system processes, using one or more audio-based ML models, the audio data that captures the spoken utterance to determine one or more audio-based characteristics of the spoken utterance. The one or more audio-based ML models can include, for example, endpointing model(s) trained to detect pause(s) in the spoken utterance captured by the audio data, warm word model(s) trained to detect one or more particular words or phrases in the spoken utterance captured by the audio data, and/or other audio-based ML models. Further, the one or more audio-based characteristics of the audio data can include, for example, an indication of one or more pauses included in the spoken utterance and optionally a location of one or more of the pauses in the spoken utterance (e.g., at the beginning of the spoken utterance, in the middle of the spoken utterance, at the end of the spoken utterance, etc.) generated using the endpointing model(s), an indication of whether one or more particular words or phrases (e.g., warm words) are present in the spoken utterance and optionally a location of one or more of the particular words or phrases in the spoken utterance (e.g., at the beginning of the spoken utterance, in the middle of the spoken utterance, at the end of the spoken utterance, etc.) generated using the warm word model(s), and/or other audio-based characteristics of the audio data.

At block 760, the system determines whether to incorporate the recognized text, that corresponds to the spoken utterance, into the transcription or to perform an assistant command that is associated with the transcription and that is based on the recognized text that corresponds to the spoken utterance. The system can determine whether to incorporate the recognized text into the transcription or to cause the assistant command to be performed based on one or more of the audio-based characteristic(s) or the annotated recognized text, and the spoken utterance. If, at an iteration of block 760, the system determines to perform the assistant command that is associated with the transcription and that is based on the recognized text that corresponds to the spoken utterance, then the system proceeds to block 762. At block 762, the system causes an automated assistant to perform the assistant command that is associated with the transcription and that is based on the recognized text that corresponds to the spoken utterance. For example, assume the transcription is a text message, assume the spoken utterance received during the dictation session corresponds to "Hey Alex, how are you? Send it", and assume the audio-based characteristic(s) indicate that the user paused after "you" and/or that "send" is a warm word that causes the automated assistant to send the text message. In this example, the system may determine that the spoken utterance provided by the user is intended to be an assistant command of sending a text message of "Hey Alex, how are you?" to a contact of "Alex" for the text message. Accordingly, the system can proceed to block 762 and cause the text message to be sent to the contact.

If, at an iteration of block 760, the system determines to incorporate the recognized text that corresponds to the spoken utterance into the transcription, then the system proceeds to block 764. At block 764, the system automatically incorporates the recognized text that corresponds to the spoken utterance into the transcription. For example, again assume the transcription is a text message, and assume the spoken utterance received during the dictation session corresponds to "Hey Alex, did you send it to Julia?". In this example, assume the audio-based characteristic(s) may still indicate that "send" is a warm word that causes the automated assistant to send the text message. However, further assume that the audio-based characteristic(s) indicate that the user did not pause. In contrast with the above example, "Hey Alex, did you send it to Julia?" may be incorporated into the text message, but the text message may not be sent.

Figure 8A:
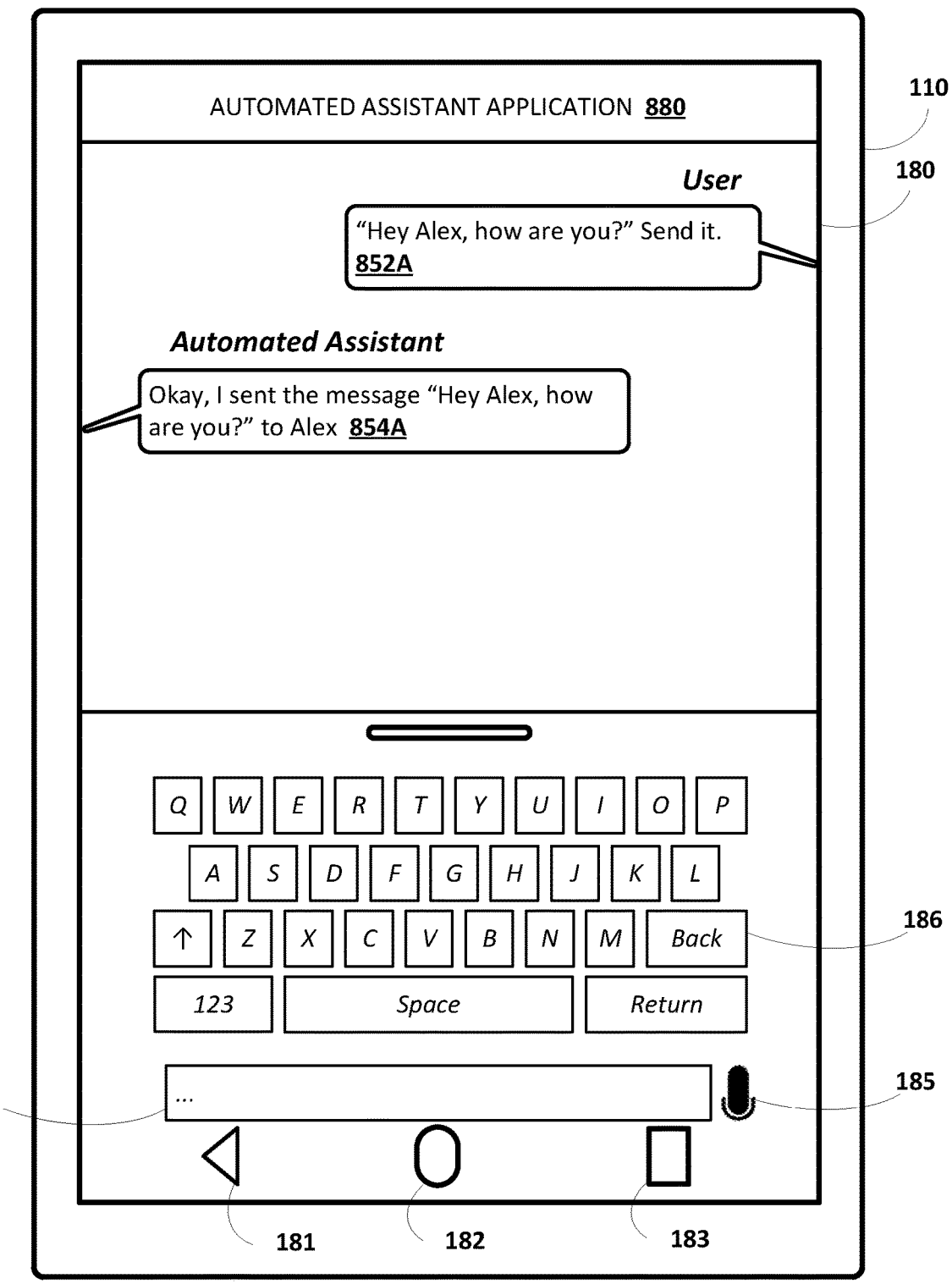
FIG. 8A and FIG. 8B illustrate various non-limiting examples of determining whether to incorporate the recognized text into the transcription or to cause the assistant command to be performed utilizing the method of FIG. 7, to be performed, in accordance with various implementations.
Figure 8B:
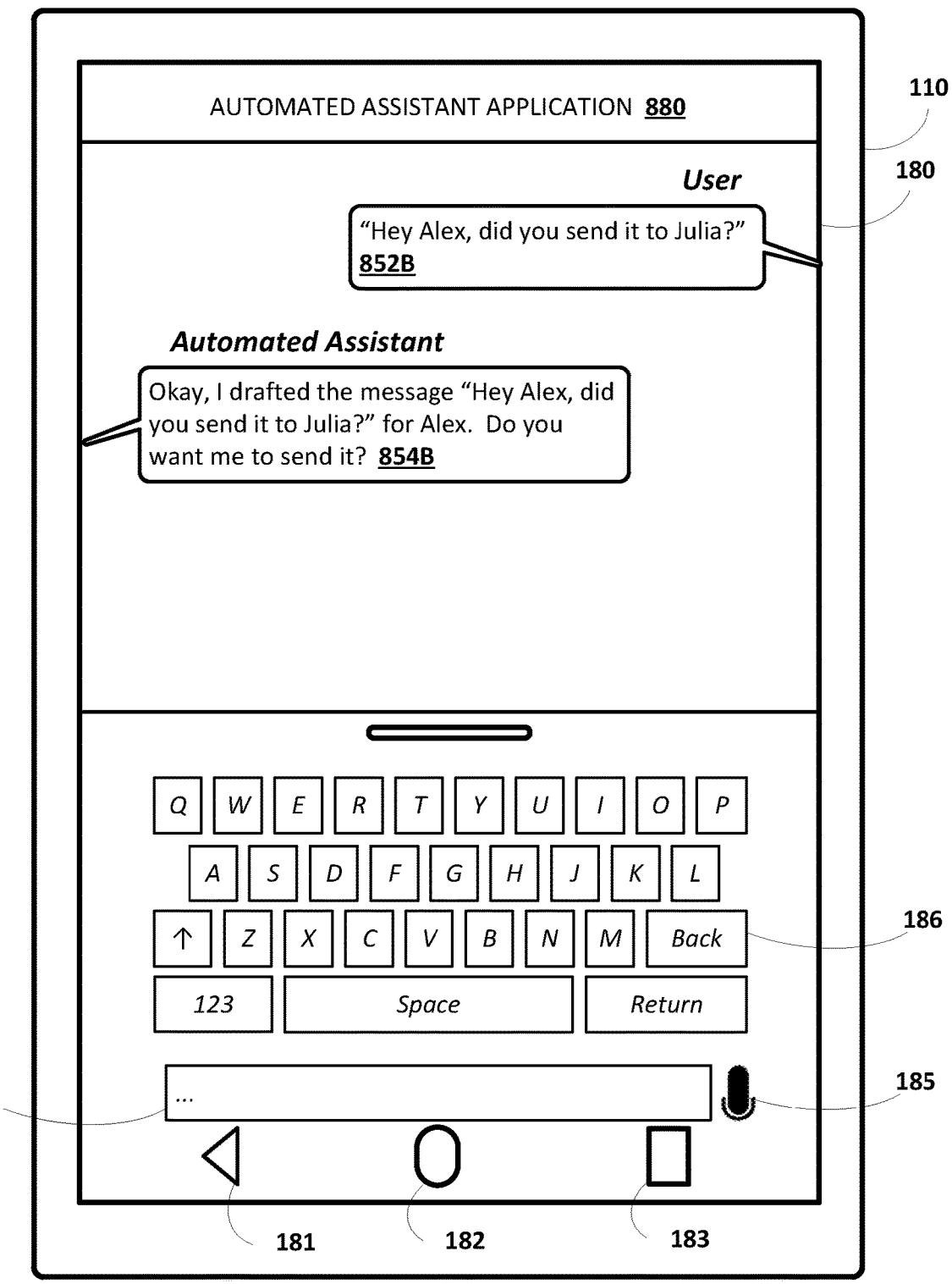

Turning now to FIGS. 8A and 8B, various non-limiting examples of determining whether to incorporate the recognized text into the transcription or to cause the assistant command to be performed utilizing the method 700 of FIG. 7 are depicted. An automated assistant can be implemented at least in part at the client device 110 (e.g., the automated assistant 115 described with respect to FIG. 1). The automated assistant can utilize a dictation system (e.g., the dictation system 160 described with respect to FIG. 1) to determine whether to incorporate the recognized text into the transcription or cause the assistant command to be performed based on the recognized text based on one or more of the audio-based characteristic(s) or the annotated recognized text, and the spoken utterance (e.g., as described with respect to the method 700 of FIG. 7). The client device 110 depicted in FIGS. 8A and 8B may be the same or substantially similar to the client device 110 described above with respect to FIGS. 4A and 4B.

Referring specifically to FIG. 8A, assume that a user of the client device 110 is utilizing an automated assistant application 880 that is accessible at the client device 110 to draft a text message. In this example, assume the user of the client device 110 provides a spoken utterance 852A of "'Hey Alex, how are you?' Send it" (and optionally in response to selection of the microphone interface element 185 or any other means of invoking the automated assistant). In this example, the transcription can correspond to recognized text corresponding to a portion of the spoken utterance 852A that is intended for the recipient "Alex" (e.g., "Hey Alex, how are you?"), and the assistant command can correspond to an additional portion of the spoken utterance 852A that indicates the user wants the message sent to the recipient "Alex" (e.g., "Send it"). However, in this example, the automated assistant must determine which portions of the spoken utterance 852A are intended for inclusion of the spoken utterance and which portions (if any) of the spoken utterance 852A are intended to cause the assistant command to be performed.

In some implementations, the automated assistant can additionally or alternatively process, using one or more audio-based ML models accessible at the client device 110, audio data corresponding to the spoken utterance 852A to determine whether to incorporate "Send it" into the transcription to the be included in the text message to be sent to a contact entry associated with "Alex" or to cause the text message (e.g., "Hey Alex, how are you?") to be sent to the contact entry associated with "Alex". For example, the automated assistant can process, using one or more endpointing models, the audio data corresponding to the spoken utterance 852A to determine whether the spoken utterance includes one or more pauses, and locations of one or more of the pauses in the spoken utterance. Also, for example, the automated assistant can process, using one or more warm word models, the audio data corresponding to the spoken utterance 852A to determine whether the spoken utterance includes one or more particular words or phrases (e.g., warm words), and locations of one or more of the particular words or phrases in the spoken utterance.

For instance, assume that, in providing the spoken utterance 852A, assume that the user paused after "you" and before "send". In this example, the automated assistant can identify the pause in the spoken utterance 852A and a location of the pause in the spoken utterance 852A based on processing the audio data using the endpointing model(s). In this instance, the automated assistant can determine that portion of the spoken utterance 852A that is intended for the recipient "Alex" (e.g., "Hey Alex, how are you?") ends after "you". Additionally, or alternatively, in providing the spoken utterance 852A, assume that "send" corresponds to a warm word detected in the spoken utterance 852A and a location of the warm word is towards the end of the spoken utterance 852A based on processing the audio data using the warm word model(s). Accordingly, based on the pauses in the spoken utterance 852A and the warm word in the spoken utterance 852A (and optionally the only word following the warm word of "send" being "it" which refers to the text message drafted using the automated assistant application 880), the automated assistant can determine the recognized text corresponding to the portion of the spoken utterance 852A of "Hey Alex, how are you?" is intended for the recipient "Alex", and determine the recognized text corresponding to the portion of the spoken utterance 852A "Send it" is intended to cause the assistant command of transmitting the portion of the spoken utterance to the additional client device associated with "Alex". In the example of FIG. 8A, this is indicated by causing synthesized speech 854A of "Okay, I sent the message 'Hey Alex, how are you?' to Alex" from the automated assistant to be provided for presentation to the user (e.g., audibly and/or visually) via the client device 110.

In contrast, and referring specifically to FIG. 8B, again assume that a user of the client device 110 is utilizing an automated assistant application 880 that is accessible at the client device 110 to draft a text message as described above with respect to FIG. 8A. However, in this example, assume the user of the client device 110 provides a spoken utterance 852B of "'Hey Alex, did you send it to Julia?" (and optionally in response to selection of the microphone interface element 185 or any other means of invoking the automated assistant). In this example, the transcription can correspond to recognized text corresponding to the spoken utterance 852B that is intended for the recipient "Alex" (e.g., "Hey Alex, did you send it to Julia?"), and that the spoken utterance 852B does not include an assistant command.

In some implementations, and similar to the example described above with respect to FIG. 8A, the automated assistant can process, using one or more audio-based ML models accessible at the client device 110, audio data corresponding to the spoken utterance 852B to determine whether the spoken utterance includes an assistant command that is associated with the transcription and that is based on the recognized text. For example, the automated assistant can process, using one or more endpointing models, the audio data corresponding to the spoken utterance 852B to determine whether the spoken utterance includes one or more pauses, and locations of one or more of the pauses in the spoken utterance. Also, for example, the automated assistant can process, using one or more warm word models, the audio data corresponding to the spoken utterance 852B to determine whether the spoken utterance includes one or more particular words or phrases (e.g., warm words), and locations of one or more of the particular words or phrases in the spoken utterance.

For instance, assume that, in providing the spoken utterance 852B, assume that the user paused after "you" and before "send". In this example, the automated assistant can identify the pause in the spoken utterance 852B and a location of the pause in the spoken utterance 852B based on processing the audio data using the endpointing model(s). Additionally, or alternatively, in providing the spoken utterance 852B, assume that "send" corresponds to a warm word detected in the spoken utterance 852B and a location of the warm word is in the middle of the spoken utterance 852B based on processing the audio data using the warm word model(s). Accordingly, despite the pause in the spoken utterance 852A, the automated assistant can determine the recognized text corresponding to the entirety of the spoken utterance 852B of "Hey Alex, did you send it to Julia?" is intended for the recipient "Alex", and determine the recognized text corresponding to the portion of the spoken utterance 852A "send it" is not intended to cause the assistant command of transmitting the portion of the spoken utterance to the additional client device associated with "Alex". Rather, the automated assistant may determine that "send it" is referencing something else that Alex was supposed to send to "Julia". In the example of FIG. 8A, this is indicated by causing synthesized speech 854B of "Okay, I drafted the message 'Hey Alex, did you send it to Julia?' for Alex. Do you want me to send it?" from the automated assistant to be provided for presentation to the user (e.g., audibly and/or visually) via the client device 110.

Notably, the spoken utterance 852A of FIG. 8A and the spoken utterance 852B of FIG. 8B include the same portion in the utterances—"send it". However, the automated assistant makes different determinations in these examples for whether to incorporate the recognized text into the email (e.g., as described with respect to FIG. 8A) or to perform the assistant command associated with the transcription (e.g., as described with respect to FIG. 8B) based on the audio-based characteristics of the utterances. Although the examples of FIGS. 8A and 8B are described with respect to determining whether to send the text message solely based on the audio-based features, it should be understood that is for the sake of example and is not meant to be limiting. For example, and with respect to FIG. 8B, assume the automated assistant determines "send it" corresponds to the assistant command based on the audio-based characteristics of the spoken utterance 852B. However, assume the automated assistant additionally or alternatively considers the state of the transcription. In this example, the automated assistant can determine that the transcription of the text message to be sent to the recipient "Alex" corresponds to "Hey Alex, did you" without any additional text. As a result, the automated assistant can determine the transcription is incomplete (e.g., as described above with respect to FIGS. 6A and 6B), and determine that the recognized text corresponding "send it to Julia" should be incorporated into the transcription. Accordingly, the automated assistant can consider additional or alternative signals in making the determination of whether to incorporate the recognized text into the transcription or to cause the assistant command, that is associated with the transcription and that is based on the recognized text, to be performed.

Moreover, although FIGS. 8A and 8B are described with respect to particular audio-based ML models and particular audio-based characteristics, it should be understood that is for the sake of example and is not meant to be limiting. For example, additional or alternative audio-based characteristics can be utilized that are generated using respective audio-based ML models. For example, the one or more audio-based characteristics can additionally or alternatively include an indication of whether the user of the client device 110 to continue providing spoken utterances without having to explicitly invoke the automated assistant generated using continued conversation model(s), an indication of an identity of the user of the client device 110 that provided the spoken utterance generated using voice identification model(s) (e.g., based on generating a voice embedding to compare to a known voice embedding of the user of the client device 110 and/or other users of the client device 110 or additional client devices), an indication that the user of the client device 110 is, in fact, speaking generated using voice activity detection model(s), and/or other audio-based characteristics of the spoken utterances 852A and/or 852B.

Further, it should be understood that the techniques described herein can also utilize various techniques to disambiguate entity references described herein. For example, in the example of FIGS. 8A and 8B, the automated assistant may determine, based on processing the spoken utterances 852A and/or 852B, that an intended recipient of the text message is an entity associated with a contact entry of "Alex". In this example, the automated assistant can access a contact list of the user of the client device 110 that is accessible at the client device 110 to identify one or more entities associated with the contact entry of "Alex". If there is only a single entity associated with the contact entry of "Alex", then the automated assistant can select that entity as the recipient of the text message. However, if there are multiple entities associated with the contact entry of "Alex" (e.g., "Alex A" and "Alex B"), then the automated assistant can prompt the user to select from among the multiple entities associated with the contact entry of "Alex" to identify the recipient. Additionally, or alternatively, the automated assistant can automatically select a given entity associated with the contact entry of "Alex" that the user of the client device 110 interacts with most frequently.

Figure 9:
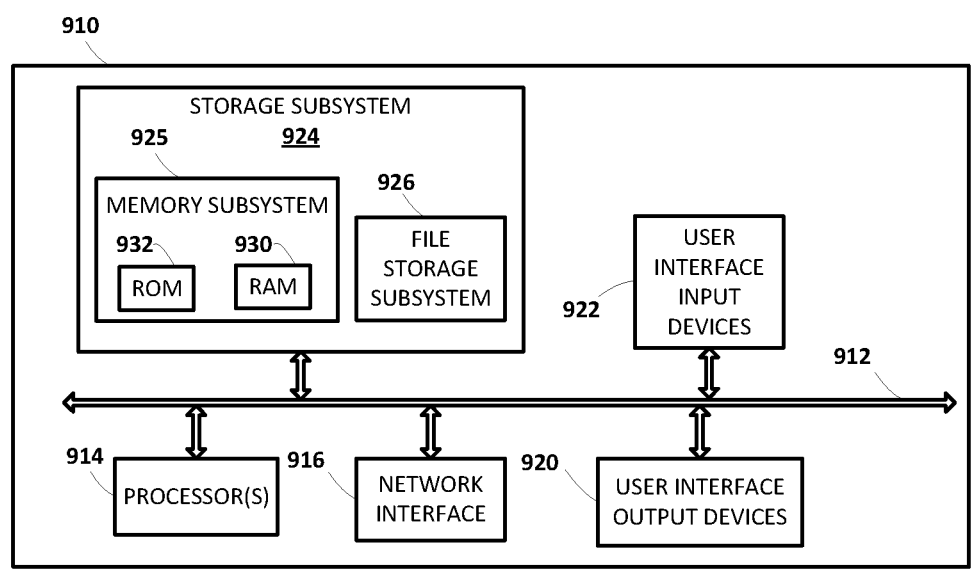
FIG. 9 illustrates an example architecture of a computing device, in accordance with various implementations.

Turning now to FIG. 9, a block diagram of an example computing device 910 that may optionally be utilized to perform one or more aspects of techniques described herein is depicted. In some implementations, one or more of the client device 110, the dictation system 160, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the methods described herein, as well as to implement various components depicted in FIG. 1.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, a method implemented by one or more processors is provided, and includes receiving audio data that captures a spoken utterance of a user of a client device, the audio data being generated one or more microphones of the client device, and the audio data being received while touch input of the user is being directed to a transcription that is displayed at the client device via a software application accessible at the client device; determining, based on the touch input of the user being directed to the transcription and the spoken utterance, whether to: incorporate recognized text, that corresponds to the spoken utterance, into the transcription, or perform an assistant command that is associated with the transcription and that is based on the recognized text that corresponds to the spoken utterance; in response to determining to incorporate the recognized text that corresponds to the spoken utterance into the transcription: automatically incorporating the recognized text that corresponds to the spoken utterance into the transcription; and in response to determining to perform the assistant command that is associated with the transcription and that is based on the recognized text that corresponds to the spoken utterance: causing an automated assistant to perform the assistant command that is associated with the transcription and that is based on the recognized text that corresponds to the spoken utterance.

These and other implementations of the technology disclosed herein can include one or more of the following features.

In some implementations, the method may further include processing, using an automatic speech recognition (ASR) model, the audio data that captures the spoken utterance to generate the recognized text that corresponds to the spoken utterance. In some versions of those implementations, the method may further include processing, using a natural language understanding (NLU) model, the recognized text that corresponds to the spoken utterance to generate annotated recognized text. In some further versions of those implementations, the method may further include determining the assistant command that is associated with the transcription and that is based on the recognized text that corresponds to the spoken utterance. Determining the assistant command, that is associated with the transcription and that is based on the recognized text that corresponds to the spoken utterance, may be based on the annotated recognized text.

In some implementations, the touch input of the user may be directed to one or more textual segments of the transcription that is displayed at the client device. In some versions of those implementations, the touch input of the user may graphically demarcate one or more of the textual segments of the transcription that is displayed at the client device. In some further versions of those implementations, determining whether to incorporate the recognized text, that corresponds to the spoken utterance, into the transcription, or to perform the assistant command, that is associated with the transcription and that is based on the recognized text that corresponds to the spoken utterance, may include determining to perform the assistant command based on the touch input of the user graphically demarcating one or more of the textual segments of the transcription.

In some implementations, the touch input of the user may be directed to one or more fields of the transcription that is displayed at the client device. In some versions of those implementations, determining whether to incorporate the recognized text, that corresponds to the spoken utterance, into the transcription, or to perform the assistant command, that is associated with the transcription and that is based on the recognized text that corresponds to the spoken utterance, may include determining to perform the assistant command based on the touch input of the user being directed to one or more fields of the transcription.

In some implementations, automatically incorporating the recognized text that corresponds to the spoken utterance into the transcription may include causing the recognized text to be visually displayed to the user via the software application accessible at the client device as part of the transcription. In some versions of those implementations, causing the recognized text to be visually displayed to the user via the software application accessible at the client device as part of the transcription may include causing the recognized text to be maintained in the transcription after additional text is incorporated into the transcription.

In some implementations, a method implemented by one or more processors is provided, and includes receiving audio data that captures a spoken utterance of a user of a client device, the audio data being generated one or more microphones of the client device, and the audio data being received while a transcription is being displayed at the client device via a software application accessible at the client device; processing, using an automatic speech recognition (ASR) model, the audio data that captures the spoken utterance to generate recognized text that corresponds to the spoken utterance; processing, using a natural language understanding (NLU) model, the recognized text that corresponds to the spoken utterance to generate annotated recognized text; processing, using an audio-based machine learning (ML) model, the audio data that captures the spoken utterance to determine one or more audio-based characteristics of the spoken utterance; determining, based on one or more of the annotated recognized text or one or more of the audio-based characteristics of the spoken utterance, whether to: incorporate recognized text, that corresponds to the spoken utterance, into the transcription, or perform an assistant command that is associated with the transcription and that is based on the recognized text that corresponds to the spoken utterance; in response to determining to incorporate the recognized text that corresponds to the spoken utterance into the transcription: automatically incorporating the recognized text that corresponds to the spoken utterance into the transcription; and in response to determining to perform the assistant command that is associated with the transcription and that is based on the recognized text that corresponds to the spoken utterance: causing an automated assistant to perform the assistant command that is associated with the transcription and that is based on the recognized text that corresponds to the spoken utterance.

These and other implementations of the technology disclosed herein can include one or more of the following features.

In some implementations, the method may further include determining the assistant command that is associated with the transcription and that is based on the recognized text that corresponds to the spoken utterance. Determining the assistant command, that is associated with the transcription and that is based on the recognized text that corresponds to the spoken utterance, may be based on the annotated recognized text.

In some implementations, the audio-based ML model may be an endpointing model trained to detect pauses in the spoken utterance, and one or more of the audio-based characteristics of the spoken utterance may correspond to one or more of pauses in the spoken utterance. In some versions of those implementations, determining whether to incorporate the recognized text, that corresponds to the spoken utterance, into the transcription, or to perform the assistant command, that is associated with the transcription and that is based on the recognized text that corresponds to the spoken utterance, may include determining to perform the assistant command associated with the transcription based on one or more of the pauses in the spoken utterance. In some further versions of those implementations, determining whether to incorporate the recognized text, that corresponds to the spoken utterance, into the transcription, or to perform the assistant command associated with the transcription, that is associated with the transcription and that is based on the recognized text that corresponds to the spoken utterance, may further include determining to perform the assistant command based on the annotated recognized text including one or more terms that correspond to the assistant command.

In some implementations, the audio-based ML model may be a warm word model trained to detect one or more particular words or phrases in the spoken utterance, and one or more of the audio-based characteristics of the spoken utterance may correspond to whether the spoken utterance includes one or more of the particular words or phrases. In some versions of those implementations, determining whether to incorporate the recognized text, that corresponds to the spoken utterance, into the transcription, or to perform the assistant command associated with the transcription, that is associated with the transcription and that is based on the recognized text that corresponds to the spoken utterance, may include determining to perform the assistant command associated with the transcription based on the spoken utterance including one or more of the particular words or phrases. In some further versions of those implementations, determining whether to incorporate the recognized text, that corresponds to the spoken utterance, into the transcription, or to perform the assistant command associated with the transcription, that is associated with the transcription and that is based on the recognized text that corresponds to the spoken utterance, may further include determining to perform the assistant command based on the annotated recognized text including one or more terms that correspond to the assistant command.

In some implementations, automatically incorporating the recognized text, that corresponds to the spoken utterance, into the transcription may include causing the recognized text to be visually displayed to the user via the software application accessible at the client device as part of the transcription. In some further versions of those implementations, causing the recognized text to be visually displayed to the user via the software application accessible at the client device as part of the transcription may include causing the recognized text to be maintained in the transcription after additional text is incorporated into the transcription.

In some implementations, a method implemented by one or more processors is provided, and includes receiving audio data that captures a spoken utterance of a user of a client device, the audio data being generated one or more microphones of the client device, and the audio data being received while a transcription is being displayed at the client device via a software application accessible at the client device; determining a state of the transcription being displayed via the software application accessible at the client device; determining, based on the state of the transcription and the spoken utterance, whether to: incorporate recognized text, that corresponds to the spoken utterance, into the transcription, or perform an assistant command that is associated with the transcription and that is based on the recognized text that corresponds to the spoken utterance; in response to determining to incorporate the recognized text that corresponds to the spoken utterance into the transcription: automatically incorporating the recognized text that corresponds to the spoken utterance into the transcription; and in response to determining to perform the assistant command that is associated with the transcription and that is based on the recognized text that corresponds to the spoken utterance: causing an automated assistant to perform the assistant command that is associated with the transcription and that is based on the recognized text that corresponds to the spoken utterance.

These and other implementations of the technology disclosed herein can include one or more of the following features.

In some implementations, the method may further include processing, using an automatic speech recognition (ASR) model, the audio data that captures the spoken utterance to generate the recognized text that corresponds to the spoken utterance. In some versions of those implementations, the method may further include processing, using a natural language understanding (NLU) model, the recognized text that corresponds to the spoken utterance to generate annotated recognized text. In some further versions of those implementations, the method may further include determining the assistant command that is associated with the transcription and that is based on the recognized text that corresponds to the spoken utterance. Determining the assistant command, that is associated with the transcription and that is based on the recognized text that corresponds to the spoken utterance, may be based on the annotated recognized text.

In some implementations, determining the state of the transcription may include one or more of: determining whether one or more fields associated with the transcription are populated; determining whether the recognized text can be utilized to populate one or more fields associated with the transcription; or determining whether the transcription is complete. In some versions of those implementations, determining whether to incorporate the recognized text, that corresponds to the spoken utterance, into the transcription, or to perform the assistant command, that is associated with the transcription and that is based on the recognized text that corresponds to the spoken utterance, may include determining to perform the assistant command associated with the transcription based on determining the recognized text can be utilized to populate one or more of the fields associated with the transcription. In some further versions of those implementations, determining whether to incorporate the recognized text, that corresponds to the spoken utterance, into the transcription, or to perform the assistant command, that is associated with the transcription and that is based on the recognized text that corresponds to the spoken utterance, may include determining one or more of the fields associated with the transcription are not currently populated. In additional or alternative versions of those implementations, determining whether to incorporate the recognized text, that corresponds to the spoken utterance, into the transcription, or to perform the assistant command, that is associated with the transcription and that is based on the recognized text that corresponds to the spoken utterance, may include determining to perform the assistant command, that is associated with the transcription and that is based on the recognized text that corresponds to the spoken utterance, based on determining the transcription is complete.

In some implementations, automatically incorporating the recognized text, that corresponds to the spoken utterance, into the transcription may include causing the recognized text to be visually displayed to the user via the software application accessible at the client device as part of the transcription. In some versions of those implementations, causing the recognized text to be visually displayed to the user via the software application accessible at the client device as part of the transcription may include causing the recognized text to be maintained in the transcription after additional text is incorporated into the transcription.

In some implementations, a method implemented by one or more processors is provided, and includes determining that a transcription that is displayed at a client device via a software application accessible at the client device is complete; in response to determining that the transcription is complete, initiating an interactive editing mode for the transcription; while in the interactive editing mode for the transcription: selecting a portion of the transcription to edit in the interactive editing mode; receiving audio data that captures a spoken utterance of a user of the client device, the audio data being generated one or more microphones of the client device, and the audio data being received while the transcription is being displayed at the client device via the software application accessible at the client device; and determining, based on processing the audio data that captures the spoken utterance, whether to: edit the selected portion of the transcription based on the spoken utterance, or select an additional portion of the transcription to edit in the interactive editing mode; in response to determining to edit the selected portion of the transcription based on the spoken utterance: cause the selected portion of the transcription to be edited based on the spoken utterance; and in response to determining to select an additional portion of the transcription to edit in the interactive editing mode: causing an automated assistant to select the additional portion of the transcription to edit in the interactive editing mode.

These and other implementations of the technology disclosed herein can include one or more of the following features.

In some implementations, determining that determining that the transcription that is displayed at the client device is complete may be based on a state of the transcription. In some implementations, the method may further include automatically initiating the interactive editing mode for the transcription in response to determining that the transcription is complete. In some implementations, the method may further include, in response to determining that the transcription is complete, receiving user input to initiate the interactive editing mode for the transcription. In some versions of those implementations, the method may further include, in response to determining that the transcription is complete, generating a prompt that requests the user initiate the interactive editing mode for the transcription; and causing the prompt that requests the user initiate the interactive editing mode to be provided for presentation to the user via the client device. The user input to initiate the interactive editing mode for the transcription may be received responsive to causing the prompt to be provided for presentation to the user via the client device. In additional or alternative versions of those implementations, the user input to initiate the interactive editing mode for the transcription may be a gesture of the user detected at the client device. In some implementations, selecting the portion of the transcription to edit in the interactive editing mode may include selecting an initial portion of the transcription to edit. In some implementations, selecting the portion of the transcription to edit in the interactive editing mode may include selecting a first portion of the transcription to edit, the first portion of the transcription including one or more predicted errors.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   receiving audio data that captures a spoken utterance of a user of a client device, the audio data being generated by one or more microphones of the client device;
   determining whether touch input of the user is being simultaneously directed to a transcription, that is displayed at the client device via a software application accessible at the client device, at the same time the audio data that captures the spoken utterance is received;

in response to determining that no touch input of the user is being simultaneously directed to the transcription at the same time the audio data that captures the spoken utterance is received:
   determining to incorporate recognized text, that corresponds to the spoken utterance, into the transcription;

in response to determining that touch input of the user is being simultaneously directed to the transcription at the same time the audio data that captures the spoken utterance is received:
   determining, based on one or more terms of the spoken utterance, whether to:
      incorporate the recognized text, that corresponds to the spoken utterance, into the transcription, or
      perform an assistant command that is associated with the transcription and that is based on the recognized text that corresponds to the spoken utterance;

in response to determining to incorporate the recognized text that corresponds to the spoken utterance into the transcription:
   automatically incorporating the recognized text that corresponds to the spoken utterance into the transcription; and in response to determining to perform the assistant command that is associated with the transcription and that is based on the recognized text that corresponds to the spoken utterance:
   causing an automated assistant to perform the assistant command that is associated with the transcription and that is based on the recognized text that corresponds to the spoken utterance.

2. The method of claim 1, further comprising:
processing, using an automatic speech recognition (ASR) model, the audio data that captures the spoken utterance to generate the recognized text that corresponds to the spoken utterance.

3. The method of claim 2, further comprising:
processing, using a natural language understanding (NLU) model, the recognized text that corresponds to the spoken utterance to generate annotated recognized text.

4. The method of claim 3, further comprising:
determining the assistant command that is associated with the transcription and that is based on the recognized text that corresponds to the spoken utterance, wherein determining the assistant command, that is associated with the transcription and that is based on the recognized text that corresponds to the spoken utterance, is based on the annotated recognized text.

5. The method of claim 1, wherein the touch input of the user is being directed to one or more textual segments of the transcription that is displayed at the client device.

6. The method of claim 5, wherein the touch input of the user graphically demarcates one or more of the textual segments of the transcription that is displayed at the client device.

7. The method of claim 6, wherein determining whether to incorporate the recognized text, that corresponds to the spoken utterance, into the transcription, or to perform the assistant command, that is associated with the transcription and that is based on the recognized text that corresponds to the spoken utterance, comprises determining to perform the assistant command based on the touch input of the user graphically demarcating one or more of the textual segments of the transcription.

8. The method of claim 1, wherein the touch input of the user is being directed to one or more fields of the transcription that is displayed at the client device.

9. The method of claim 8, wherein determining whether to incorporate the recognized text, that corresponds to the spoken utterance, into the transcription, or to perform the assistant command, that is associated with the transcription and that is based on the recognized text that corresponds to the spoken utterance, comprises determining to perform the assistant command based on the touch input of the user being directed to one or more fields of the transcription.

10. The method of claim 1, wherein automatically incorporating the recognized text that corresponds to the spoken utterance into the transcription comprises:
causing the recognized text to be visually displayed to the user via the software application accessible at the client device as part of the transcription.

11. The method of claim 10, wherein causing the recognized text to be visually displayed to the user via the software application accessible at the client device as part of the transcription comprises causing the recognized text to be maintained in the transcription after additional text is incorporated into the transcription.

12. A system comprising:
at least one processor; and
memory storing instructions that, when executed, cause the at least one processor to be operable to:
   receive audio data that captures a spoken utterance of a user of a client device, the audio data being generated by one or more microphones of the client device;
   determine whether touch input of the user is being simultaneously directed to a transcription, that is displayed at the client device via a software application accessible at the client device, the audio data that captures the spoken utterance is received;
   in response to determining that no touch input of the user is being simultaneously directed to the transcription at the same time the audio data that captures the spoken utterance is received:
      determine to incorporate recognized text, that corresponds to the spoken utterance, into the transcription;
   in response to determining that touch input of the user is being simultaneously directed to the transcription at the same time the audio data that captures the spoken utterance is received:
      determine, based on one or more terms of the spoken utterance, whether to:
         incorporate the recognized text, that corresponds to the spoken utterance, into the transcription, or
         perform an assistant command that is associated with the transcription and that is based on the recognized text that corresponds to the spoken utterance;
   in response to determining to incorporate the recognized text that corresponds to the spoken utterance into the transcription:
      automatically incorporate the recognized text that corresponds to the spoken utterance into the transcription; and
   in response to determining to perform the assistant command that is associated with the transcription and that is based on the recognized text that corresponds to the spoken utterance:

cause an automated assistant to perform the assistant command that is associated with the transcription and that is based on the recognized text that corresponds to the spoken utterance.

13. The system of claim 12, wherein the at least one processor is further operable to:
process, using an automatic speech recognition (ASR) model, the audio data that captures the spoken utterance to generate the recognized text that corresponds to the spoken utterance.

14. The system of claim 13, wherein the at least one processor is further operable to:
process, using a natural language understanding (NLU) model, the recognized text that corresponds to the spoken utterance to generate annotated recognized text.

15. The system of claim 14, wherein the at least one processor is further operable to:
determine the assistant command that is associated with the transcription and that is based on the recognized text that corresponds to the spoken utterance, wherein determining the assistant command, that is associated with the transcription and that is based on the recognized text that corresponds to the spoken utterance, is based on the annotated recognized text.

16. The system of claim 12, wherein the touch input of the user is being directed to one or more textual segments of the transcription that is displayed at the client device, wherein the touch input of the user graphically demarcates one or more of the textual segments of the transcription that is displayed at the client device, and wherein the instructions to determine whether to incorporate the recognized text, that corresponds to the spoken utterance, into the transcription, or to perform the assistant command, that is associated with the transcription and that is based on the recognized text that corresponds to the spoken utterance, comprise instructions to determine to perform the assistant command based on the touch input of the user graphically demarcating one or more of the textual segments of the transcription.

17. The system of claim 12, wherein the touch input of the user is being directed to one or more fields of the transcription that is displayed at the client device, and wherein the instructions to determine whether to incorporate the recognized text, that corresponds to the spoken utterance, into the transcription, or to perform the assistant command, that is associated with the transcription and that is based on the recognized text that corresponds to the spoken utterance, comprise instructions to determine to perform the assistant command based on the touch input of the user being directed to one or more fields of the transcription.

18. The system of claim 12, wherein the instructions to automatically incorporate the recognized text that corresponds to the spoken utterance into the transcription comprise instructions to:
cause the recognized text to be visually displayed to the user via the software application accessible at the client device as part of the transcription.

19. The system of claim 18, wherein the instructions to cause the recognized text to be visually displayed to the user via the software application accessible at the client device as part of the transcription comprise instructions to cause the recognized text to be maintained in the transcription after additional text is incorporated into the transcription.

20. A non-transitory computer-readable storage medium storing instructions that, when executed, cause at least one processor to be operable to perform operations, the operations comprising:
receiving audio data that captures a spoken utterance of a user of a client device, the audio data being generated by one or more microphones of the client device;
determining whether touch input of the user is being simultaneously directed to a transcription, that is displayed at the client device via a software application accessible at the client device, at the same time the audio data that captures the spoken utterance is received;
in response to determining that no touch input of the user is being simultaneously directed to the transcription at the same time the audio data that captures the spoken utterance is received:
determining to incorporate recognized text, that corresponds to the spoken utterance, into the transcription;
in response to determining that touch input of the user is being simultaneously directed to the transcription at the same time the audio data that captures the spoken utterance is received:
determining, based on one or more terms of the spoken utterance, whether to:
incorporate the recognized text, that corresponds to the spoken utterance, into the transcription, or
perform an assistant command that is associated with the transcription and that is based on the recognized text that corresponds to the spoken utterance;
in response to determining to incorporate the recognized text that corresponds to the spoken utterance into the transcription:
automatically incorporating the recognized text that corresponds to the spoken utterance into the transcription; and
in response to determining to perform the assistant command that is associated with the transcription and that is based on the recognized text that corresponds to the spoken utterance:
causing an automated assistant to perform the assistant command that is associated with the transcription and that is based on the recognized text that corresponds to the spoken utterance.

\* \* \* \* \*